United States Patent
Matsumoto et al.

(10) Patent No.: US 11,076,122 B2
(45) Date of Patent: Jul. 27, 2021

(54) COMMUNICATION TERMINAL, IMAGE MANAGEMENT SYSTEM, AND IMAGE MANAGEMENT METHOD

(71) Applicant: Olympus Corporation, Hachioji (JP)

(72) Inventors: Saori Matsumoto, Tokyo (JP); Kensuke Ishii, Tokyo (JP); Arata Shinozaki, Tokyo (JP); Yoshitaka Sato, Tokyo (JP)

(73) Assignee: Olympus Corporation, Tokyo (JP)

( * ) Notice: Subject to any disclaimer, the term of this patent is extended or adjusted under 35 U.S.C. 154(b) by 60 days.

(21) Appl. No.: 16/584,834

(22) Filed: Sep. 26, 2019

(65) Prior Publication Data

US 2020/0053313 A1 Feb. 13, 2020

Related U.S. Application Data

(63) Continuation of application No. PCT/JP2017/018167, filed on May 15, 2017.

(51) Int. Cl.
*H04N 5/232* (2006.01)
*H04N 5/91* (2006.01)
*H04L 12/58* (2006.01)

(52) U.S. Cl.
CPC ............. *H04N 5/91* (2013.01); *H04L 51/10* (2013.01); *H04L 51/32* (2013.01)

(58) Field of Classification Search
CPC ........................... H04N 5/232; H04N 5/23206
USPC ............................................ 348/211.1, 222.1
See application file for complete search history.

(56) References Cited

U.S. PATENT DOCUMENTS

| 6,636,259 B1 * | 10/2003 | Anderson | H04N 1/00151 348/211.3 |
| 2002/0054224 A1 * | 5/2002 | Wasula | H04N 1/2112 348/231.6 |
| 2004/0002302 A1 * | 1/2004 | Takemoto | H04N 1/0014 455/3.06 |

(Continued)

FOREIGN PATENT DOCUMENTS

| JP | 2014-071480 A | 4/2014 |
| JP | 2015-002441 A | 1/2015 |

(Continued)

OTHER PUBLICATIONS

International Search Report ("ISR") from corresponding International Application No. PCT/JP2017/018167, dated Jul. 11, 2017 (1 pg.), with English language translation (1 pg.).

*Primary Examiner* — Anthony J Daniels
(74) *Attorney, Agent, or Firm* — John C. Pokotylo; Pokotylo Patent Services

(57) ABSTRACT

A communication terminal includes a communicator, an image processing circuit, and a controller. The controller is configured to acquire a first image. The image processing circuit is configured to generate a second image by performing image processing on the first image. The controller is configured to upload the second image to a page of a social networking service (SNS) by transmitting the second image to an SNS server by using the communicator. The controller is configured to record image management information in which the first image, image processing information that identifies the image processing, and an address of the page are associated with each other onto a storage medium.

3 Claims, 23 Drawing Sheets

(56) References Cited

U.S. PATENT DOCUMENTS

| | | | |
|---|---|---|---|
| 2008/0176547 A1* | 7/2008 | Paul | H04M 1/72522 455/418 |
| 2009/0122329 A1* | 5/2009 | Hegemier | G06T 11/60 358/1.9 |
| 2016/0147836 A1* | 5/2016 | Liu | G06F 16/176 707/758 |
| 2018/0152500 A1* | 5/2018 | Park | G06T 7/70 |

FOREIGN PATENT DOCUMENTS

| | | |
|---|---|---|
| JP | 2015-220616 A | 12/2015 |
| JP | 2015-230506 A | 12/2015 |
| JP | 2016-164796 A | 9/2016 |

* cited by examiner

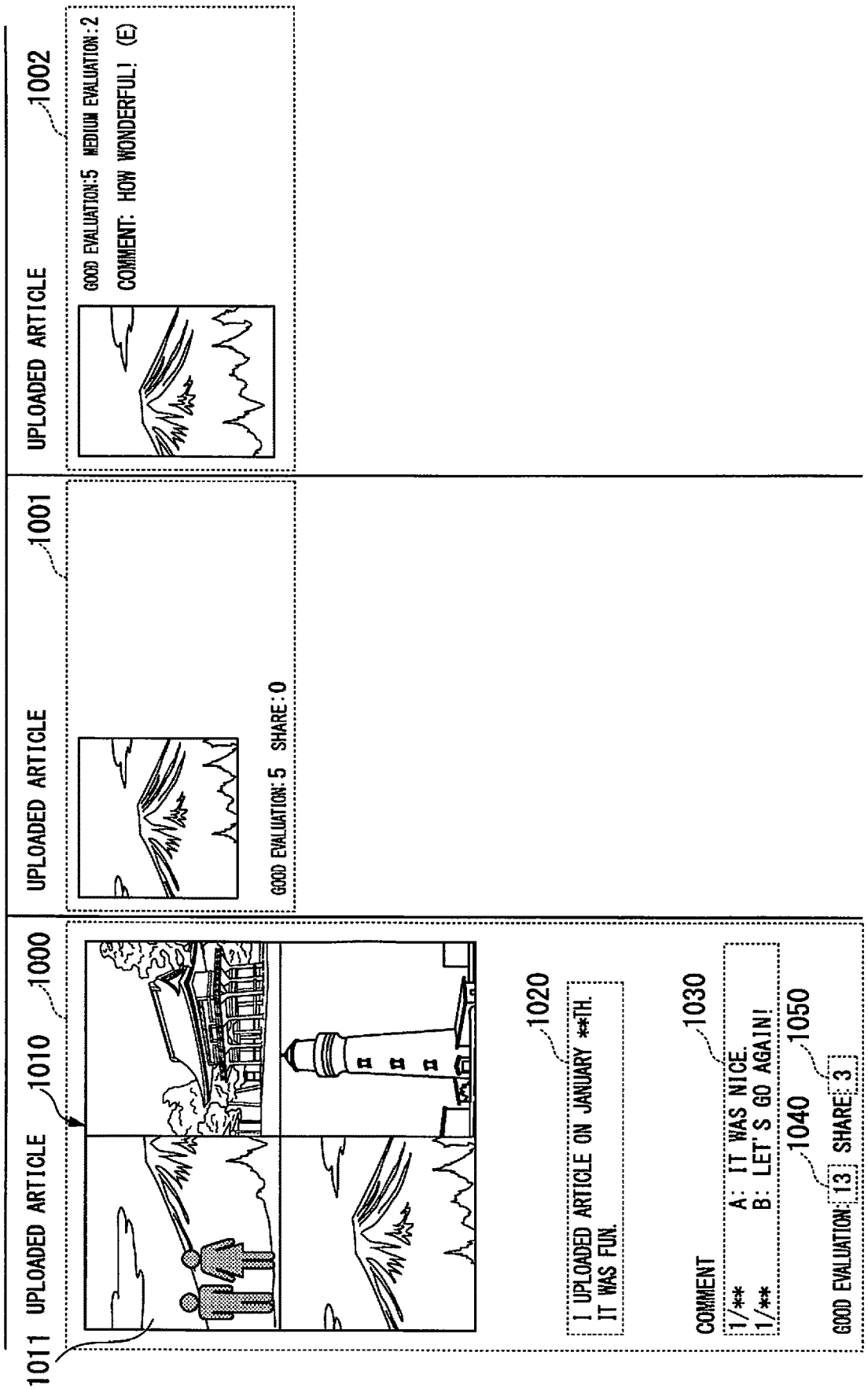

FIG. 11

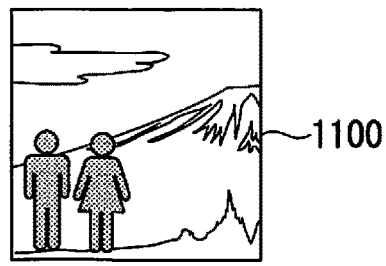
1100

| | | |
|---|---|---|
| UPLOAD DESTINATION | SNS SERVICE 1 —1101 | |
| ACCOUNT | XXX —1102 | |

TIME-SERIES CHANGE OF
USER'S RESPONSES

| | 1/** | 2/** | |
|---|---|---|---|
| GOOD EVALUATION | 10 | 13 | —1110 |
| SHARE | 1 | 3 | —1111 |
| COMMENT | A: IT WAS NICE.<br>B: LET'S GO AGAIN! | | —1112 |

UPLOADING DATE   2017/1/** —1115

IMAGE PROCESSING
TRIMMING: AREA (0, 500)~(3000, 3000)
EXPOSURE CORRECTION: +0.7EV
WHITE BALANCE CORRECTION: SUNLIGHT
PICTURESQUE FILTERING: STRONG SOFT FILTERING
RESOLUTION (RESIZING): 3000 x 2500           —1120

SIMULTANEOUSLY
UPLOADED IMAGE   **.jpg, *.jpg —1130

INFORMATION
AT TIME OF UPLOADING
| POSITION INFORMATION | INSERT | —1140 |
| PHOTOGRAPHING CAMERA INFORMATION | DELETE | |
| SERVER IMAGE PROCESSING | ABSENT | —1150 |
| FACE RECOGNITION RESULT | PRESENT A, B | —1160 |
| TAG INFORMATION | PRESENT A, B, C | —1170 |

UPLOADED ARTICLE
I UPLOADED ARTICLE LIKE OO
ON JANUARY **TH.
IT WAS FUN.           —1180

FIG. 12

| | SNS SERVICE 1 | SNS SERVICE 1 | SNS SERVICE 2 |
|---|---|---|---|
| SERVICE NAME | | | |
| ACCOUNT | XXX | YYY | ZZZ |
| ADDRESS | http://www.SNS SERVICE 1/XXX/**** | http://www.SNS SERVICE 1/YYY/**** | http://www.SNS SERVICE 2/ZZZ/**** |
| UPLOADING DATE | 2017/1/** | 2017/2/** | 2017/2/** |
| SIMULTANEOUSLY UPLOADED IMAGE | ****.jpg, ***.jpg | ABSENT | ABSENT |
| IMAGE PROCESSING | TRIMMING: AREA (0, 500)~(3000, 3000) EXPOSURE CORRECTION: +0.7EV WHITE BALANCE CORRECTION: SUNLIGHT PICTURESQUE FILTERING: STRONG SOFT FILTERING RESOLUTION CONVERSION (RESIZING): 3000 X 2500 | TRIMMING: AREA (0, 0)~(1800, 1800) EXPOSURE CORRECTION: ABSENT WHITE BALANCE CORRECTION: CLOUDY PICTURESQUE FILTERING: ABSENT RESOLUTION CONVERSION (RESIZING): 900 X 900 | TRIMMING: AREA (2000, 0)~(3000, 3000) EXPOSURE CORRECTION: +0.7EV WHITE BALANCE CORRECTION: ABSENT PICTURESQUE FILTERING: COLOR FILTERING RESOLUTION CONVERSION (RESIZING): 500 X 500 |
| THUMBNAIL OF PROCESSED IMAGE | | | |
| ARTICLE | I UPLOADED ARTICLE ON JANUARY **TH. IT WAS FUN. | | ............ |
| POSITION INFORMATION | INSERT | DELETE | DELETE |
| PHOTOGRAPHING CAMERA INFORMATION | DELETE | ADD | ADD |
| SERVER IMAGE PROCESSING | ABSENT | FILTERING NO. 15 | UNKNOWN |
| PERSONAL RECOGNITION RESULT | PRESENT A, B | ABSENT | ABSENT |
| TAG INFORMATION | PRESENT A, B, C | ABSENT | ABSENT |
| EVALUATION | ACQUIRING DATE: 1/** GOOD EVALUATION: 10 ACQUIRING DATE: 2/** GOOD EVALUATION: 13 | ACQUIRING DATE: 2/** GOOD EVALUATION: 5 | ACQUIRING DATE: 2/** GOOD EVALUATION: 5 MEDIUM EVALUATION: 2 |
| SHARE | ACQUIRING DATE: 1/** 1 ITEM (A) ACQUIRING DATE: 2/** 3 ITEMS (A, C, D) | ABSENT | ABSENT |
| COMMENT | 1/** A: IT WAS NICE. 1/** B: LET'S GO AGAIN! | | HOW WONDERFUL! E (2/**) |

1200

COMMUNICATION TERMINAL, IMAGE MANAGEMENT SYSTEM, AND IMAGE MANAGEMENT METHOD

The present application is a continuation application based on International Patent Application No. PCT/JP2017/018167 filed on May 15, 2017, the content of which is incorporated herein by reference.

BACKGROUND OF THE INVENTION

Field of the Invention

The present invention relates to a communication terminal, an image management system, and an image management method.

Description of Related Art

As a means for posting information online, a social networking service (SNS) is used. A user can post (upload) images, texts (sentences), and the like to a webpage provided by an SNS.

A technology for checking responses from other users to images posted by the SNS is disclosed in Japanese Unexamined Patent Application, First Publication No. 2014-071480. In this technology, an image processing device receives posted images and response information that represents responses from other users to the images. The image processing device displays a plurality of images in the priority order according to the response information.

SUMMARY OF THE INVENTION

According to a first aspect of the present invention, a communication terminal includes a communicator, an image processing circuit, and a controller. The controller is configured to acquire a first image. The image processing circuit is configured to generate a second image by performing image processing on the first image. The controller is configured to upload the second image to a page of a social networking service (SNS) by transmitting the second image to an SNS server by using the communicator. The controller is configured to record image management information in which the first image, image processing information that identifies the image processing, and an address of the page are associated with each other onto a storage medium.

According to a second aspect of the present invention, in the first aspect, meta information may have been added to the first image and the second image. The controller may be configured to delete the meta information added to the second image. The controller may be configured to transmit the second image from which the meta information has been deleted to the SNS server by using the communicator. The controller may be configured to record the image management information in which the first image, the image processing information, the address, and first information that represents that the meta information has been deleted are associated with each other onto the storage medium.

According to a third aspect of the present invention, in the first aspect, meta information may have been added to the first image and the second image. The controller may be configured to receive first information that represents that the meta information has been deleted from the SNS server by using the communicator when the SNS server deletes the meta information added to the second image and transmits the first information. The controller may be configured to record the image management information in which the first image, the image processing information, the address, and the first information are associated with each other onto the storage medium.

According to a fourth aspect of the present invention, in the first aspect, the controller may be configured to receive second information that represents at least one of TAG information and a personal recognition result associated with the second image by the SNS server from the SNS server by using the communicator. The controller may be configured to record the image management information in which the first image, the image processing information, the address, and the second information are associated with each other onto the storage medium.

According to a fifth aspect of the present invention, in the first aspect, the controller may be configured to generate second information that represents at least one of TAG information and a personal recognition result associated with the second image and transmit the second information to the SNS server by using the communicator. The controller may be configured to record the image management information in which the first image, the image processing information, the address, and the second information are associated with each other onto the storage medium.

According to a sixth aspect of the present invention, in the first aspect, the controller may be configured to record the image management information corresponding to each of a plurality of SNSs including the SNS onto the storage medium.

According to a seventh aspect of the present invention, in the first aspect, the controller may be configured to record the image management information corresponding to each of a plurality of accounts in the SNS onto the storage medium.

According to an eighth aspect of the present invention, in the first aspect, the controller may be configured to record the image management information corresponding to each of a plurality of addresses including the address onto the storage medium.

According to a ninth aspect of the present invention, in the first aspect, the controller may be configured to upload a third image different from the second image to the page of the SNS on which the second image has been uploaded by transmitting the third image to the SNS server by using the communicator. The controller may be configured to record the image management information in which the first image, the image processing information, the address, and third information regarding the third image are associated with each other onto the storage medium.

According to a tenth aspect of the present invention, in the first aspect, the controller may be configured to accept designation of the address. The image processing circuit may be configured to perform image processing on the first image associated with the address accepted by the controller on the basis of the image processing information associated with the address accepted by the controller.

According to an eleventh aspect of the present invention, in the first aspect, the controller may be configured to record the image management information in which the first image, the image processing information, the address, and fourth information regarding the second image are associated with each other onto the storage medium. The controller may be configured to display the fourth information on a display. The controller may be configured to accept designation of any one piece of the fourth information displayed on the display. The image processing circuit may be configured to perform image processing on the first image associated with the designated fourth information on the basis of the image processing information associated with the designated fourth information.

According to a twelfth aspect of the present invention, in the first aspect, the controller may be configured to receive server image processing information that identifies image processing performed on the second image by the SNS server from the SNS server by using the communicator. The controller may be configured to record the image management information in which the first image, the image processing information, the address, and the server image processing information are associated with each other onto the storage medium.

According to a thirteenth aspect of the present invention, in the first aspect, the controller may be configured to receive the second image on which image processing has been performed by the SNS server from the SNS server by using the communicator. The controller may be configured to generate difference information that represents the difference between the second image on which image processing has been performed by the image processing circuit and the second image on which image processing has been performed by the SNS server. The controller may be configured to record the image management information in which the first image, the image processing information, the address, and the difference information are associated with each other onto the storage medium.

According to a fourteenth aspect of the present invention, an image management system includes an image uploading system and a social networking service (SNS) server. The image uploading system is configured to acquire a first image. The image uploading system is configured to generate a second image by performing image processing on the first image. The image uploading system is configured to upload the second image to a page of an SNS by transmitting the second image to the SNS server. The image uploading system is configured to record image management information in which the first image, image processing information that identifies the image processing, and an address of the page are associated with each other onto a first storage medium. The SNS server includes a first communicator and a first controller. The first controller is configured to receive the second image from the image uploading system by using the first communicator. The first controller is configured to record the second image on a location represented by the address in a second storage medium that stores information of the page of the SNS.

According to a fifteenth aspect of the present invention, in the fourteenth aspect, the image uploading system may include a first communication terminal and a second communication terminal. The first communication terminal may include a second communicator, an image processing circuit, and a second controller. The second controller may be configured to acquire the first image. The image processing circuit may be configured to generate the second image by performing the image processing on the first image. The second controller may be configured to transmit the second image to the second communication terminal by using the second communicator. The second communication terminal may include a third communicator and a third controller. The third controller may be configured to receive the second image from the first communication terminal by using the third communicator. The third controller may be configured to upload the second image to the page of the SNS by transmitting the second image to the SNS server by using the third communicator. The third controller may be configured to transmit the address of the page to the first communication terminal by using the third communicator. The second controller may be configured to receive the address of the page from the second communication terminal by using the second communicator. The second controller may be configured to record the image management information in which the first image, the image processing information, and the address of the page are associated with each other onto the first storage medium.

According to a sixteenth aspect of the present invention, an image management method includes an image acquisition step, an image generation step, an uploading step, and a recording step. In the image acquisition step, a first image is acquired. In the image generation step, a second image is generated by performing image processing on the first image. In the uploading step, the second image is uploaded to a page of a social networking service (SNS) by transmitting the second image to an SNS server. In the recording step, image management information in which the first image, image processing information that identifies the image processing, and an address of the page are associated with each other is recorded onto a storage medium.

BRIEF DESCRIPTION OF THE DRAWINGS

FIG. 10 is a diagram showing information displayed on a display according to the first embodiment of the present invention.

FIG. 11 is a diagram showing information displayed on a display according to the first embodiment of the present invention.

FIG. 12 is a diagram showing image management information in the first embodiment of the present invention.

DETAILED DESCRIPTION OF THE INVENTION

Hereinafter, embodiments of the present invention will be described with reference to the drawings.

A user can post an image on a page of each social networking service (SNS). Image processing that is different according to each SNS has been performed on the image. For example, in a case where responses from other users to an image uploaded to a page of a certain SNS is positive, there is a demand that the same image processing as that which is performed on the image be performed on another image. It is hoped that information of image processing that has been performed on each image is easily managed in order to satisfy the demand. An SNS may be established on an intranet in a hospital. It is possible that image processing is performed on a medical image acquired by an endoscope or using computed tomography (CT) and the image is uploaded to a page of an SNS. In a case where it is determined that image processing on a medical image is effective, there is a demand that the same image processing as that which is performed on the image be performed on another image. It is hoped that information of image processing that has been performed on each image is easily managed in order to satisfy the demand.

First Embodiment

Figure 1:
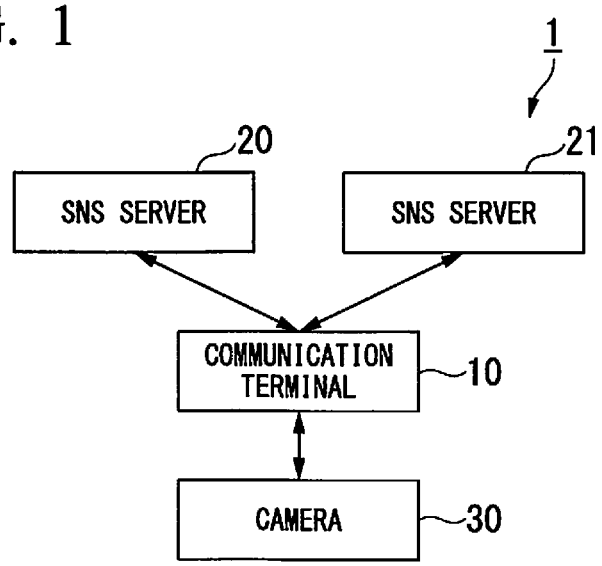
FIG. 1 is a block diagram showing a configuration of an image management system according to a first embodiment of the present invention.

FIG. 1 shows a configuration of an image management system 1 according to a first embodiment of the present invention. As shown in FIG. 1, the image management system 1 includes a communication terminal 10, an SNS server 20, an SNS server 21, and a camera 30. The communication terminal 10 and the camera 30 constitute an image uploading system.

The communication terminal 10 is an electronic device such as a smart phone or a personal computer. The communication terminal 10 acquires an image from the camera 30. In addition, the communication terminal 10 uploads the image acquired from the camera 30 by transmitting the image to the SNS server 20 and the SNS server 21. The SNS server 20 and the SNS server 21 upload the image received from the communication terminal 10 on a page of an SNS managed by each of the SNS servers. The SNS server 20 and the SNS server 21 offer a service, and the service offered by the SNS server 21 is different from that offered by the SNS server 20. The camera 30 performs photographing and generates an image.

One SNS server or three or more SNS servers may be included in the image management system 1. The communication terminal 10 stores an image in advance. For this reason, the camera 30 is not essential to the image management system 1.

The communication terminal 10 may be constituted as an image management server and the camera 30 may be replaced by an electronic device such as a smart phone or a personal computer.

Figure 2:
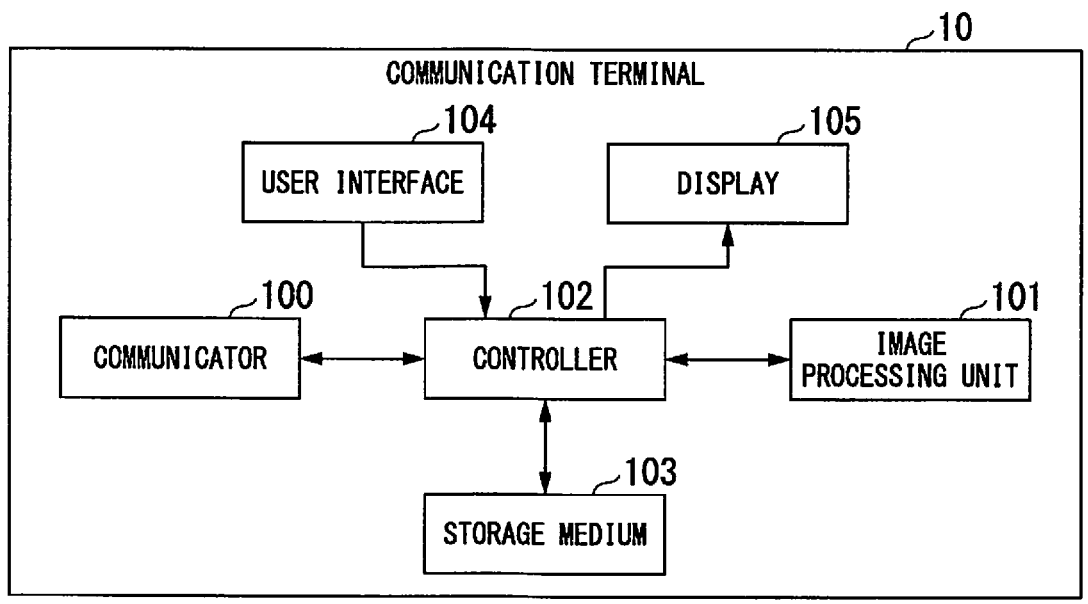
FIG. 2 is a block diagram showing a configuration of a communication terminal according to the first embodiment of the present invention.

FIG. 2 shows a configuration of the communication terminal 10. As shown in FIG. 2, the communication terminal 10 includes a communicator 100 (third communicator), an image processing unit 101, a controller 102 (third controller), a storage medium 103 (first storage medium), a user interface 104, and a display 105.

The communicator 100 performs communication with the SNS server 20, the SNS server 21, and the camera 30. Communication performed by the communicator 100 may be wireless communication or wired communication. The communicator 100 receives an image from the camera 30. The communicator 100 transmits a processed image on which image processing has been performed to the SNS server 20 and the SNS server 21. The communicator 100 transmits information (a text or the like) that is displayed with an image on a page of an SNS and information of an account of the SNS to the SNS server 20 and the SNS server 21. The communicator 100 receives various kinds of information of an SNS from the SNS server 20 and the SNS server 21. The communicator 100 may include a first communicator that performs communication with the SNS server 20 and the SNS server 21 and second communicator that performs communication with the camera 30.

Hereinafter, an image acquired from the camera 30 will be described as an original image. For example, an original image is a RAW image. An original image may be a JPEG image generated by the camera 30 by processing a RAW image. The communicator 100 may transmit an original image to the SNS server 20 and the SNS server 21 in addition to a processed image on which image processing has been performed.

Each of the image processing unit 101 (image processing circuit) and the controller 102 comprises at least one of a processor and a logic circuit. For example, the processor is at least one of a central processing unit (CPU), a digital signal processor (DSP), and a graphics processing unit (GPU). For example, the logic circuit is at least one of an application specific integrated circuit (ASIC) and a field-programmable gate array (FPGA). Each of the image processing unit 101 and the controller 102 may include one or a plurality of processors. Each of the image processing unit 101 and the controller 102 may include one or a plurality of logic circuits. The image processing unit 101 generates a processed image (second image) by performing image processing on an original image (first image) acquired from the camera 30. The controller 102 constitutes a control unit. The controller 102 controls the system of the communication terminal 10.

For example, the functions of the controller 102 can be realized as software functions when the controller 102 reads and executes a program including commands defining the operations of the controller 102. This program, for example, may be provided by using a "computer-readable storage medium" such as a flash memory. In addition, the program described above may be transmitted from a computer including a storage device and the like in which this program is stored to the communication terminal 10 through a transmission medium or by using carrier waves in a transmission medium. The "transmission medium" transmitting a program is a medium that has a function of transmitting information such as a network (communication network) including the Internet and the like or a communication circuit line (communication line) including a telephone circuit line and the like. In addition, the program described above may realize at least some of the functions described above. Furthermore, the program described above may be a differential file (differential program) that can realize the functions described above in combination with a program that has already been recorded in a computer.

The controller 102 transmits an image and information to the SNS server 20 and the SNS server 21 by using the communicator 100. More specifically, the controller 102 controls the communicator 100 such that an image and information are transmitted to the SNS server 20 and the SNS server 21. In other words, the controller 102 causes the communicator 100 to transmit an image and information for the SNS server 20 and the SNS server 21. In this way, the communicator 100 transmits an image and the information to the SNS server 20 and the SNS server 21. The controller 102 receives information held by the SNS server 20 and the SNS server 21 from the SNS server 20 and the SNS server 21 by using the communicator 100. More specifically, the controller 102 controls the communicator 100 such that information is received from the SNS server 20 and the SNS server 21. In other words, the controller 102 causes the communicator 100 to receive information transmitted from the SNS server 20 and the SNS server 21. In this way, the communicator 100 receives information from the SNS server 20 and the SNS server 21.

For example, the controller 102 acquires an original image by receiving the original image from the camera 30 by using the communicator 100. In a case where an external storage medium in which an original image is recorded is attached to the communication terminal 10, the controller 102 may acquire the original image by reading the original image from the external storage medium. The controller 102 uploads a processed image on which image processing has been performed to a page of an SNS by transmitting the processed image to the SNS server 20 and the SNS server 21 by using the communicator 100. The controller 102 may upload an original image to a page of an SNS by transmitting the original image to the SNS server 20 and the SNS server 21 in addition to a processed image on which image processing has been performed. The controller 102 transmits information that is displayed with an image on a page of an SNS to the SNS server 20 and the SNS server 21 by using the communicator 100. The controller 102 receives various kinds of information of an SNS from the SNS server 20 and the SNS server 21 by using the communicator 100.

The storage medium 103 is a nonvolatile storage device. For example, the storage medium 103 is at least one of an erasable programmable read only memory (EPROM), an electrically erasable programmable read-only memory (EEPROM), a flash memory, and a hard disk drive. The storage medium 103 stores image management information in which an original image, image processing information that identifies image processing performed on the original image, and an address of a page of an SNS are associated with each other. For example, image processing information includes at least one of a type of image processing and a parameter used for the image processing. The storage medium 103 may be arranged outside the communication terminal 10. In other word, the storage medium 103 is not essential to the communication terminal 10.

For example, an address of a page of an SNS is a uniform resource locator (URL). An address of a page of an SNS may be information (ID or the like) that can be identified by the SNS server 20 and the SNS server 21. In a case where a plurality of SNS servers (services) are included in an image management system, image management information may include identification information of an SNS server. For example, information of an SNS server is an IP address of the SNS server or a service name. In a case where a user can use a plurality of accounts for one SNS, image management information may include identification information of an account.

The user interface 104 constitutes an operation unit. For example, the user interface 104 is at least one of a button, a switch, a key, a mouse, a joystick, a touch pad, a track ball, and a touch panel. The user interface 104 outputs an instruction to the controller 102 when a predetermined operation is performed by a user. The user interface 104 is not essential to the communication terminal 10.

The display 105 constitutes a display unit. For example, the display 105 is at least one of a liquid crystal display and an organic electro luminescence (EL) display. The display 105 may be a touch panel display. In this case, the user interface 104 and the display 105 are integrated. The display 105 displays an image and various kinds of information. The display 105 is not essential to the communication terminal 10.

By adopting the above-described configuration, an image uploading system acquires an original image (first image). The image uploading system generates a processed image (second image) by performing image processing on the original image. The image uploading system uploads the second image to a page of an SNS by transmitting the processed image to the SNS server 20 and the SNS server 21. The image uploading system records image management information in which the original image, image processing information that identifies the image processing, and an address of a page are associated with each other onto the storage medium 103 (first storage medium).

Image management information includes an original image, image processing information that identifies image processing performed on the original image, and an address of a page of an SNS. For this reason, the communication terminal 10 can easily manage information of image processing that has been performed on each image. In addition, the communication terminal 10 does not need to hold a processed image on which image processing has been performed. For this reason, the communication terminal 10 can reduce the capacity of the storage medium 103 necessary for management of image processing.

Figure 3:
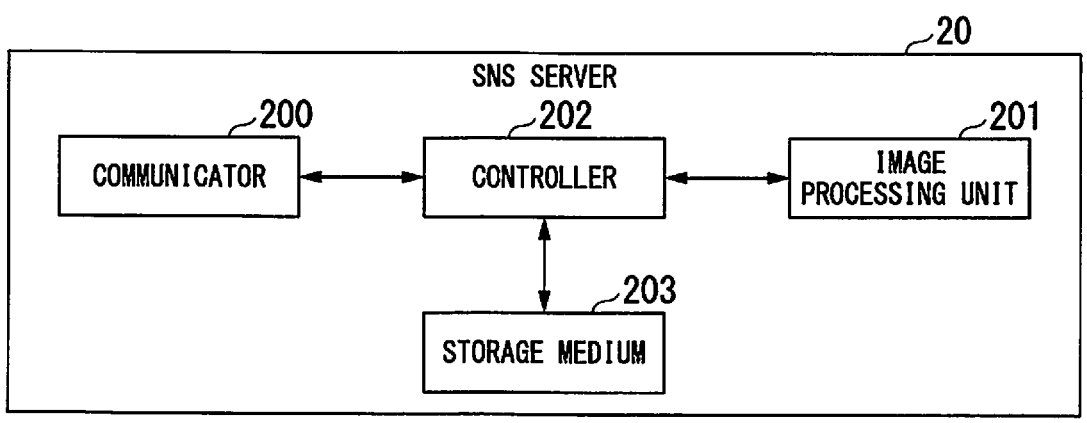
FIG. 3 is a block diagram showing a configuration of an SNS server according to the first embodiment of the present invention.

FIG. 3 shows a configuration of the SNS server 20. As shown in FIG. 3, the SNS server 20 includes a communicator 200 (first communicator), an image processing unit 201, a controller 202 (first controller), and a storage medium 203 (second storage medium).

The communicator 200 performs communication with the communication terminal 10. Communication performed by the communicator 200 may be wireless communication or wired communication. For example, the communicator 200 may perform communication via the Internet. The communicator 200 receives a processed image from the communication terminal 10. The communicator 200 may receive an original image from the communication terminal 10 in addition to a processed image. The communicator 200 receives information that is displayed with an image on a page of an SNS from the communication terminal 10. The communicator 200 transmits various kinds of information of an SNS to the communication terminal 10.

Each of the image processing unit 201 (image processing circuit) and the controller 202 comprises at least one of a processor and a logic circuit. Each of the image processing unit 201 and the controller 202 may include one or a plurality of processors. Each of the image processing unit 201 and the controller 202 may include one or a plurality of logic circuits. The image processing unit 201 performs image processing on a processed image or an original image received from the communication terminal 10. The image processing unit 201 does not necessarily perform image processing on a processed image or an original image received from the communication terminal 10. The image processing unit 201 is not essential to the SNS server 20. The controller 202 constitutes a control unit. The controller 202 controls the system of the SNS server 20.

The controller 202 may read and execute a program including commands defining the operations of the controller 202. In other words, the functions of the controller 202 can be realized as software functions. The implementation form of this program is the same as the implementation form of the program that realizes the functions of the controller 102 shown in FIG. 2.

The controller 202 receives an image from the communication terminal 10 by using the communicator 200. More specifically, the controller 202 controls the communicator 200 such that an image is received from the communication terminal 10. In other words, the controller 202 causes the communicator 200 to receive an image transmitted from the communication terminal 10. In this way, the communicator 200 receives an image from the communication terminal 10. The controller 202 transmits information held by the SNS server 20 to the communication terminal 10 by using the communicator 200. More specifically, the controller 202 controls the communicator 200 such that information is transmitted to the communication terminal 10. In other words, the controller 202 causes the communicator 200 to transmit information for the communication terminal 10. In this way, the communicator 200 transmits information to the communication terminal 10.

For example, the controller 202 receives a processed image from the communication terminal 10 by using the communicator 200. The controller 202 may receive an original image from the communication terminal 10 by using the communicator 200 in addition to a processed image. The controller 202 receives information that is displayed with an image on a page of an SNS from the communication terminal 10 by using the communicator 200. The controller 202 records a processed image on a location represented by an address in the storage medium 203 that stores information of a page of an SNS. In addition, the controller 202 associates information that is displayed with a processed image on a page of an SNS with the processed image, and records the information on the storage medium 203. The controller 202 may record an original image on the storage medium 203 in addition to a processed image. The controller 202 transmits various kinds of information of an SNS to the communication terminal 10 by using the communicator 200.

The controller 202 receives a display request of a page of an SNS from the communication terminal 10 or another communication terminal by using the communicator 200. A display request of a page of an SNS includes an address. When a display request of a page of an SNS is received, the controller 202 reads a processed image from a location represented by an address included in the display request in the storage medium 203. The controller 202 transmits the read processed image and information for displaying a page of an SNS to the communication terminal 10 or another communication terminal by using the communicator 200. For example, information for displaying a page of an SNS is a hypertext markup language (HTML) file. In a case where there is information that is displayed with a processed image on a page of an SNS, the controller 202 also transmits the information to the communication terminal 10 or another communication terminal by using the communicator 200.

The storage medium 203 is a nonvolatile storage device. For example, the storage medium 203 is at least one of an EPROM, an EEPROM, a flash memory, and a hard disk drive. The storage medium 203 stores a processed image received from the communication terminal 10 or a processed image on which image processing has been performed by the image processing unit 201. The storage medium 203 may store an original image received from the communication terminal 10 or an original image on which image processing has been performed by the image processing unit 201 in addition to a processed image. In addition, the storage medium 203 stores information that is displayed with an image on a page of an SNS. The storage medium 203 may be arranged outside the SNS server 20. In other word, the storage medium 203 is not essential to the SNS server 20.

The SNS server 21 is constituted similarly to the SNS server 20. For this reason, the configuration of the SNS server 21 will not be described. Hereinafter, an example in which the communication terminal 10 performs communication with the SNS server 20.

Figure 4:
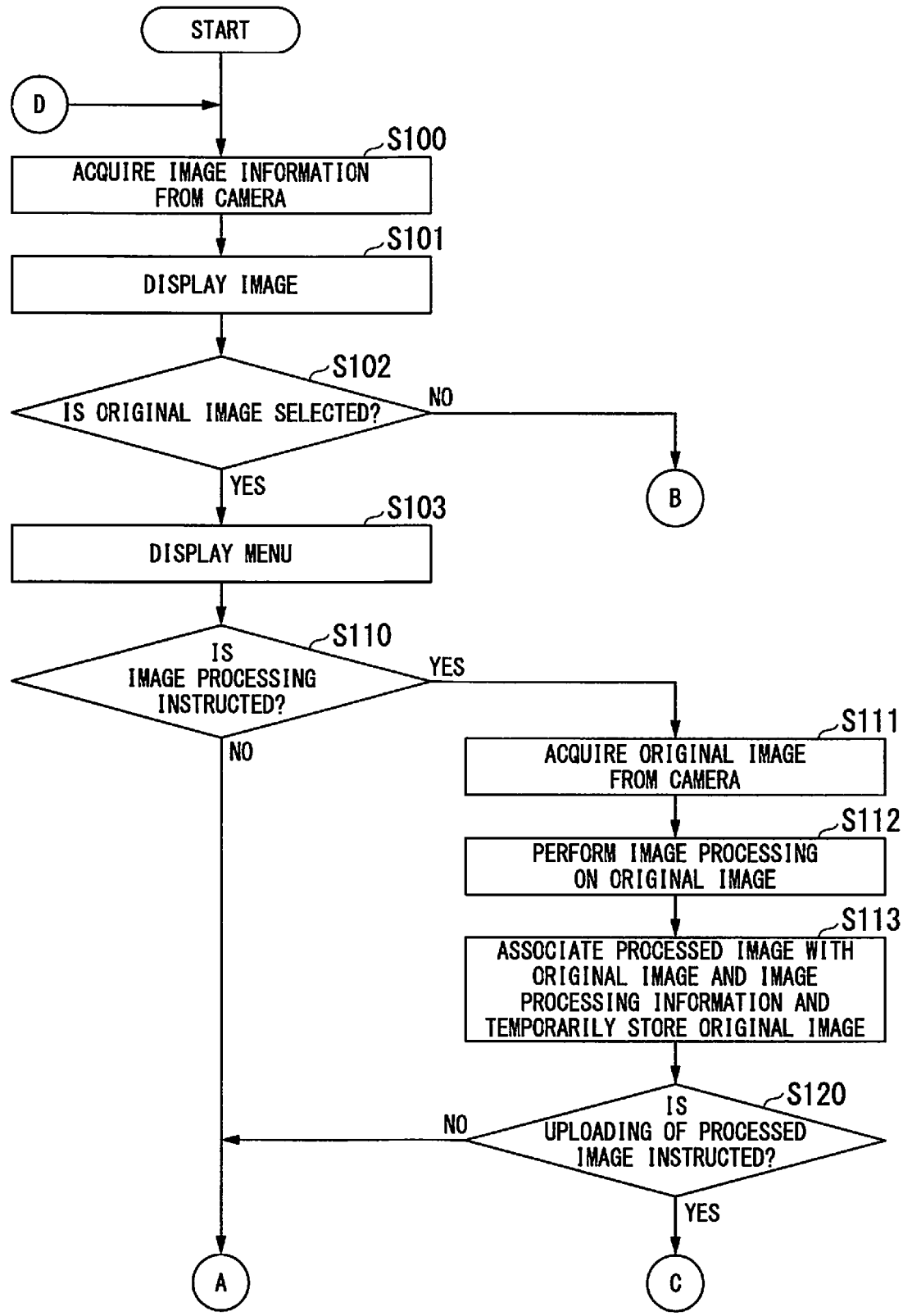
FIG. 4 is a flow chart showing a procedure of a process executed by the communication terminal according to the first embodiment of the present invention.
Figure 5:
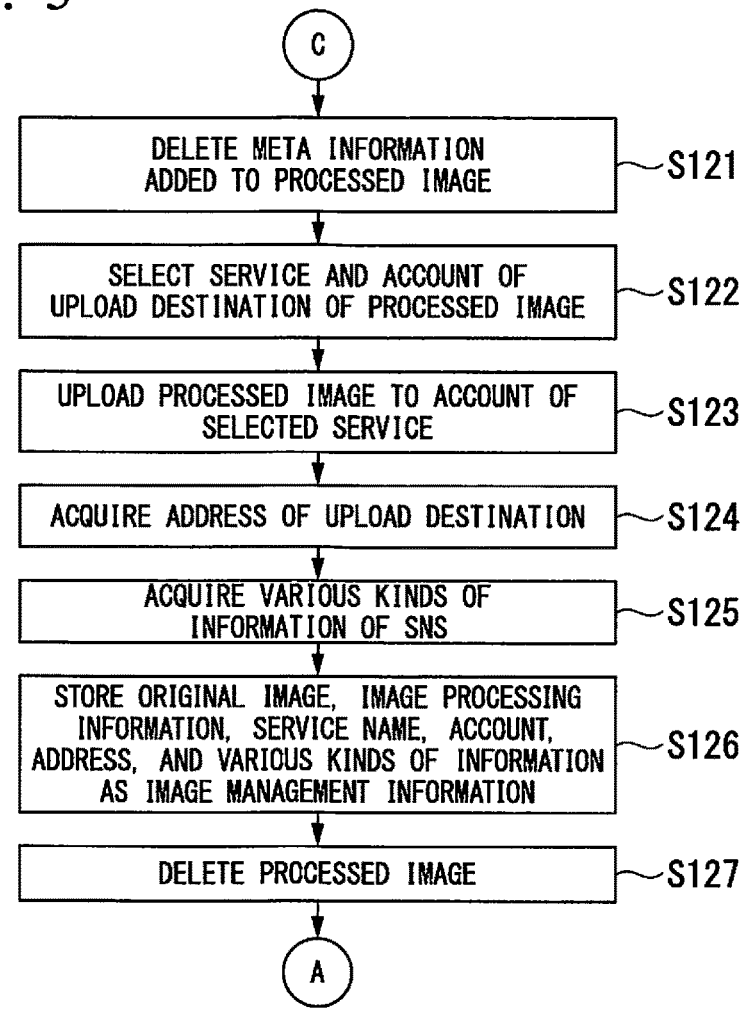
FIG. 5 is a flow chart showing a procedure of a process executed by the communication terminal according to the first embodiment of the present invention.
Figure 6:
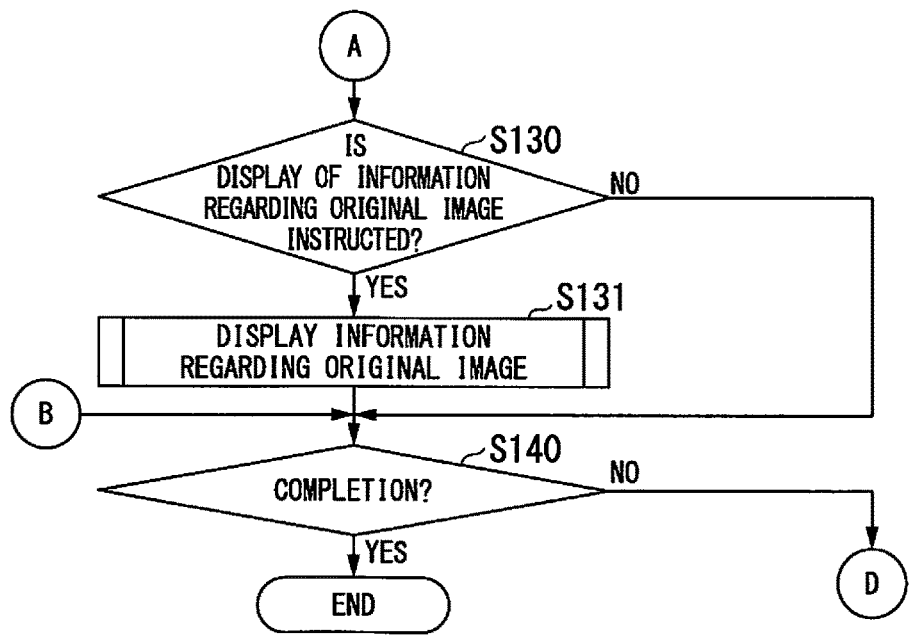
FIG. 6 is a flow chart showing a procedure of a process executed by the communication terminal according to the first embodiment of the present invention.

FIG. 4, FIG. 5, and FIG. 6 show a procedure of a process executed by the communication terminal 10. The operation of the communication terminal 10 will be described with reference to FIGS. 4 to 6. For example, the process shown in FIGS. 4 to 6 is executed when an album application is executed in the communication terminal 10.

(Step S100)

The controller 102 acquires one or a plurality of pieces of image information from the camera 30 by receiving the image information from the camera 30 by using the communicator 100. For example, image information is a thumbnail of an original image. After step S100, the process of step S101 is executed.

(Step S101)

The controller 102 displays images based on the image information acquired from the camera 30 on the display 105. For example, the display 105 displays a list of a plurality of thumbnails corresponding to a plurality of original images. After step S101, the process of step S102 is executed.

(Step S102)

A user selects one of the images displayed in step S101 and inputs an instruction for selecting an original image to the user interface 104. When a user inputs an instruction for selecting an original image to the user interface 104, the controller 102 accepts the instruction from the user. The controller 102 determines whether or not an instruction for selecting an original image is accepted. In step S102, when the controller 102 determines that an instruction for selecting an original image is accepted, the processing of step S103 is executed. In step S102, when the controller 102 determines that an instruction for selecting an original image is not accepted, the processing of step S140 is executed.

(Step S103)

The controller 102 displays a menu on the display 105. For example, the menu includes graphics for accepting instructions from a user regarding various kinds of image processing, uploading of an image, display of information, and completion for the selected image. After step S103, the process of step S110 is executed.

(Step S110)

When a user inputs an instruction for predetermined image processing to the user interface 104, the controller 102 accepts the instruction from the user. The controller 102 determines whether or not an instruction for image processing is accepted. In step S110, when the controller 102 determines that an instruction for image processing is accepted, the processing of step S111 is executed. In step S110, when the controller 102 determines that an instruction for image processing is not accepted, the processing of step S130 is executed.

(Step S111)

The controller 102 receives the original image selected by a user in step S102 from the camera 30 by using the communicator 100. In this way, the controller 102 acquires the original image from the camera 30. After step S111, the process of step S112 is executed.

(Step S112)

The controller 102 outputs the original image acquired from the camera 30 to the image processing unit 101 and requests image processing for the original image to the image processing unit 101. The image processing unit 101 generates a processed image by performing image processing on the original image. The image processing unit 101 outputs the generated processed image and image processing information corresponding to the image processing performed on the original image to the controller 102. The image processing unit 101 may generate a thumbnail of a processed image in addition to the processed image. After step S112, the process of step S113 is executed.

For example, image processing performed by the image processing unit 101 is at least one of trimming, exposure correction, white balance correction, picturesque filtering, and resolution conversion (resizing). The image processing unit 101 may perform image processing other than the above-described image processing. In a case where an original image is a RAW image, the image processing unit 101 performs development and the above-described image processing. In a case where an original image is a JPEG image, the image processing unit 101 performs the above-described image processing.

(Step S113)

The controller 102 associates a processed image with an original image and image processing information. The controller 102 temporarily records the processed image, the original image, and the image processing information on the storage medium 103. Image processing information identifies the image processing performed on the original image in step S112. Image processing information includes at least one of a type of image processing and a parameter used for the image processing. After step S113, the process of step S120 is executed.

The controller 102 may transmit a processed image to the camera 30 by using the communicator 100. The camera 30 may receive a processed image from the communication terminal 10 and store the processed image.

(Step S120)

When a user inputs an instruction for uploading a processed image to the user interface 104, the controller 102 accepts the instruction from the user. The controller 102 determines whether or not an instruction for uploading a processed image is accepted. In step S120, when the controller 102 determines that an instruction for uploading a processed image is accepted, the processing of step S121 is executed. In step S120, when the controller 102 determines that an instruction for uploading a processed image is not accepted, the processing of step S130 is executed.

(Step S121)

Meta information has been added to an original image and a processed image (second image). For example, meta information is at least one of a photographing position, a photographing date and time, and information that represents the camera 30 used for photographing. Meta information may be other information added to an image. For example, meta information has been added to an original image and a processed image as exchangeable image file format (Exif) information. The controller 102 deletes meta information added to a processed image. After step S121, the process of step S122 is executed.

Meta information may be confidential information. Leakage of confidential information can be avoided by deleting meta information.

(Step S122)

For example, a user inputs an instruction for designating a service and an account of an upload destination of a processed image to the user interface 104. The controller 102 accepts the instruction from a user. The controller 102 selects a service and an account of an upload destination of a processed image on the basis of the instruction. After step S122, the process of step S123 is executed. The service and the account of an upload destination of a processed image may be registered in advance. A user may select a service and an account that are registered in advance.

(Step S123)

The controller 102 transmits a processed image and information of an account to the SNS server 20 corresponding to the service selected in step S122 by using the communicator 100. In this way, the controller 102 uploads a processed image to a page of an SNS. When there is information that is displayed with an image on a page of an SNS, the controller 102 transmits the information to the SNS server 20 by using the communicator 100 in addition to a processed image and information of an account. After step S123, the process of step S124 is executed.

In the SNS server 20, the controller 202 receives a processed image and information of an account from the communication terminal 10 by using the communicator 200. The controller 202 associates a processed image with an account and records the processed image on the storage medium 203. At this time, the controller 202 records a processed image on a location represented by a predetermined address in the storage medium 203. When information that is displayed with an image on a page of an SNS is transmitted from the communication terminal 10, the controller 202 receives the information from the communication terminal 10 by using the communicator 200. The controller 202 associates the information with an account and records the information on the storage medium 203.

A plurality of processed images may be uploaded. For example, the image processing unit 101 may generate a plurality of processed images by performing image processing on a plurality of original images. The image processing unit 101 may generate a plurality of processed images by repetitively performing image processing on the same original image. The controller 102 may transmit a plurality of processed images to the SNS server 20 by using the communicator 100. An original image may be uploaded in addition to a processed image. In other words, the controller 102 may transmit a processed image and an original image to the SNS server 20 by using the communicator 100.

A user can view an image and a text (article) on a page of an SNS. A user may input a text to the user interface 104. The user interface 104 may accept a text from the user. When a text is accepted by the user interface 104, the controller 102 may transmit the text to the SNS server 20 in addition to a processed image.

(Step S124)

In the SNS server 20, the controller 202 transmits an address of a page to which a processed image has been uploaded to the communication terminal 10 by using the communicator 200. The controller 102 receives the address from the SNS server 20 by using the communicator 100. In this way, the controller 102 acquires the address. The controller 102 may designate an address of a page to which a processed image is uploaded. In this case, the controller 102 transmits a processed image, information of an account, and an address to the SNS server 20 by using the communicator 100 in step S123. In this case, the process of step S124 is not necessary. After step S124, the process of step S125 is executed.

(Step S125)

The controller 102 transmits an information acquisition request to the SNS server 20 by using the communicator 100. An information acquisition request includes the address acquired in step S124. The controller 102 acquires various kinds of information of an SNS by receiving the information from the SNS server 20 by using the communicator 100. Details of information acquired in step S125 will be described below. After step S125, the process of step S126 is executed.

In the SNS server 20, the controller 202 receives an information acquisition request from the communication terminal 10 by using the communicator 200. The controller 202 reads various kinds of information of an SNS from a location represented by an address included in the information acquisition request in the storage medium 203. The controller 202 transmits the read information to the communication terminal 10 by using the communicator 200.

(Step S126)

The controller 102 records image management information in which an original image, image processing information, a service name, an account, an address, and various kinds of information are associated with each other onto the storage medium 103. In image management information, a service name, an account, and various kinds of information are not essential. Therefore, the controller 102 records image management information in which at least an original image, image processing information, and an address are associated with each other onto the storage medium 103 in step S126. After step S126, the process of step S127 is executed.

The controller 102 may transmit image management information to the camera 30 by using the communicator 100. The camera 30 may receive image management information from the communication terminal 10 and record the image management information on a storage medium.

In step S121, meta information is deleted. For this reason, the controller 102 transmits a processed image from which meta information has been deleted to the SNS server 20 by using the communicator 100 in step S123. Various kinds of information recorded as image management information in step S126 include information (first information) that represents that meta information has been deleted. Therefore, the controller 102 records image management information in which an original image, image processing information, an address, and information that represents that meta information has been deleted are associated with each other onto the storage medium 103 in step S126.

(Step S127)

The controller 102 deletes a processed image temporarily stored on the storage medium 103. After step S127, the process of step S130 is executed.

The capacity of the storage medium 103 is saved by deleting a processed image. When a processed image is temporarily stored in the camera 30, the controller 102 may transmit an instruction for deleting a processed image to the camera 30 by using the communicator 100. When the camera 30 receives an instruction for deleting a processed image, the camera 30 deletes a processed image.

(Step S130)

When a user inputs an instruction for displaying information regarding an original image to the user interface 104, the controller 102 accepts the instruction from the user. The controller 102 determines whether or not an instruction for displaying information regarding an original image is accepted. In step S130, when the controller 102 determines that an instruction for displaying information regarding an original image is accepted, the process of step S131 is executed. In step S130, when the controller 102 determines that an instruction for displaying information regarding an original image is not accepted, the process of step S140 is executed.

(Step S131)

The controller 102 executes a process for displaying information regarding an original image. Details of the process executed in step S131 will be described below. After step S131, the process of step S140 is executed.

(Step S140)

When a user inputs an instruction for completion to the user interface 104, the controller 102 accepts the instruction from the user. The controller 102 determines whether or not an instruction for completion is accepted. In step S140, when the controller 102 determines that an instruction for completion is accepted, the process shown in FIGS. 4 to 6 is completed. In step S140, when the controller 102 determines that an instruction for completion is not accepted, the process of step S100 is executed.

The SNS server 20 may delete meta information added to a processed image. In the SNS server 20, the controller 202 deletes meta information added to a processed image received from the communication terminal 10. The controller 202 associates a processed image from which meta information has been deleted with an account, and records the processed image on the storage medium 203. The controller 202 transmits information (first information) that represents that meta information has been deleted to the communication terminal 10 by using the communicator 200.

When the SNS server 20 deletes meta information added to a processed image (second image) and transmits information that represents that meta information has been deleted, the controller 102 receives the information from the SNS server 20 by using the communicator 100 in step S125. The controller 102 records image management information in which an original image, image processing information, an address, and information that represents that meta information has been deleted are associated with each other onto the storage medium 103 in step S126.

The controller 102 can repetitively perform the process shown in FIGS. 4 to 6. For this reason, it is possible to upload a processed image to each of a plurality of SNSs. The controller 102 may record image management information corresponding to each of a plurality of SNSs on the storage medium 103. In other words, the controller 102 may record image management information corresponding to a service offered by each of a plurality of SNS servers on the storage medium 103. In this way, the communication terminal 10 can easily manage information of image processing performed on an image corresponding to each of a plurality of services.

In addition, it is possible to upload a processed image for each of a plurality of accounts in one SNS. The controller 102 may record image management information corresponding to each of a plurality of accounts in an SNS onto the storage medium 103. In this way, the communication terminal 10 can easily manage information of image processing performed on an image corresponding to each of a plurality of accounts.

In addition, it is possible to upload a processed image for each of a plurality of addresses. The controller 102 may record image management information corresponding to each of a plurality of addresses on the storage medium 103. In this way, the communication terminal 10 can easily manage information of image processing performed on an image corresponding to each of a plurality of addresses.

The process of steps S100 to S103 is not essential. The process of steps S100 to S103 may be executed or may not be executed regardless of whether or not any other process is executed. The process of step S121 and step S125 is not essential. The process of step S121 and step S125 may be executed or may not be executed regardless of whether or not any other process is executed. The process executed after the process of step S126 is executed is not essential. For example, the process of step S127 is not essential. The process executed after the process of step S126 is executed may be executed or may not be executed regardless of whether or not any other process is executed. For example, the process of step S127 may be executed or may not be executed regardless of whether or not any other process is executed.

Figure 7:
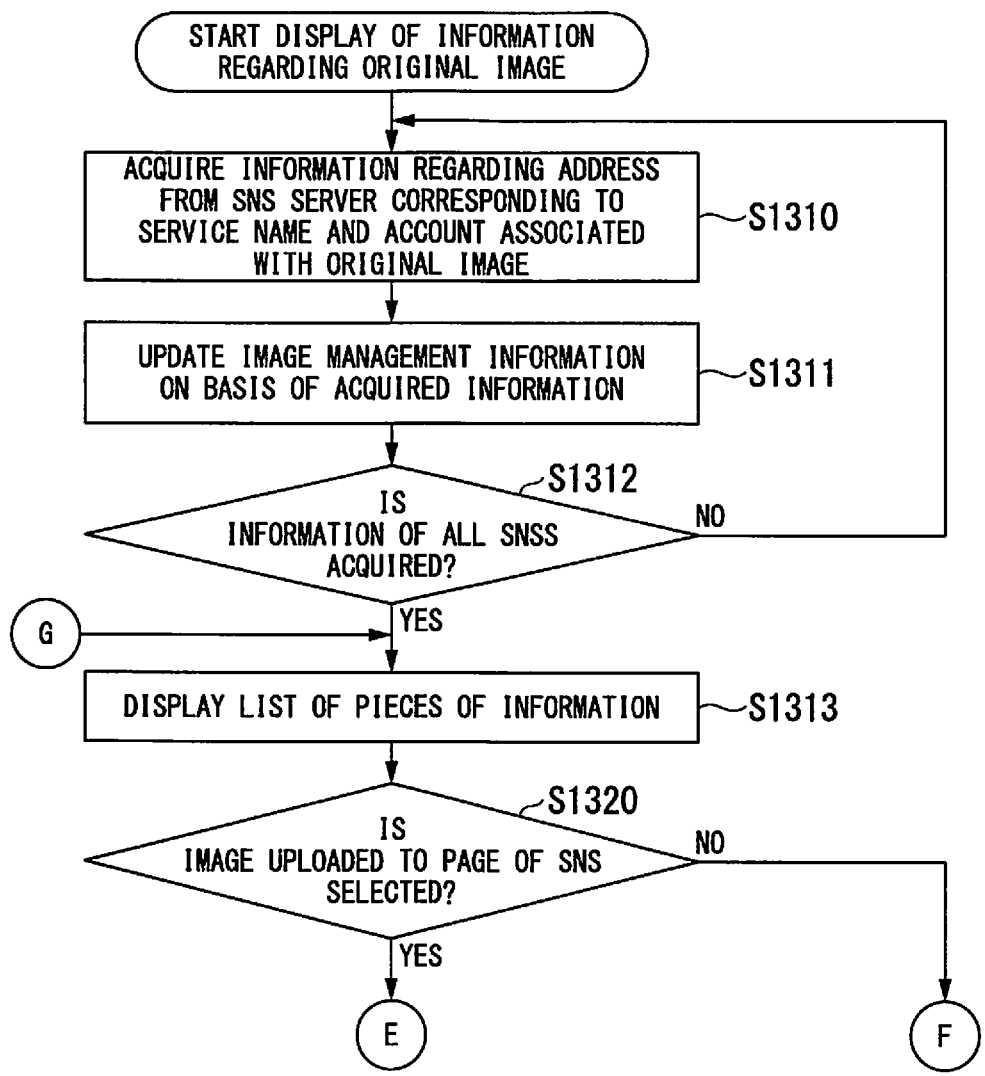
FIG. 7 is a flow chart showing a procedure of a process executed by the communication terminal according to the first embodiment of the present invention.
Figure 8:
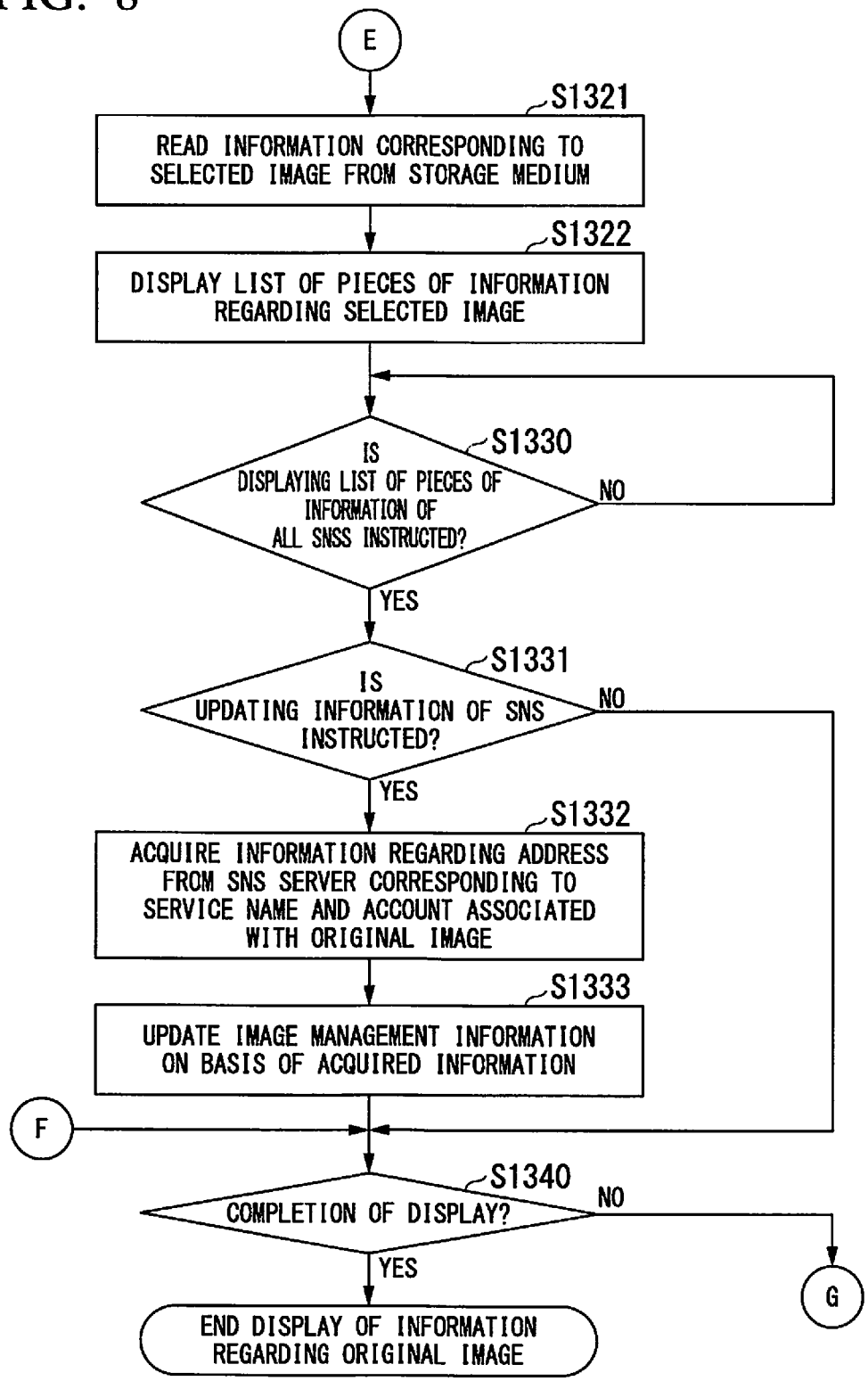
FIG. 8 is a flow chart showing a procedure of a process executed by the communication terminal according to the first embodiment of the present invention.

FIG. 7 and FIG. 8 show details of the process of step S131. The operation of the communication terminal 10 will be described with reference to FIG. 7 and FIG. 8.

(Step S1310)

The controller 102 acquires a service name, an account, and an address associated with the original image selected in step S102 in image management information. The controller 102 transmits an information acquisition request to the SNS server 20 corresponding to the service name and the account that have been acquired by using the communicator 100. An information acquisition request includes the address. The controller 102 acquires information by receiving the information from the SNS server 20. Details of information acquired in step S1310 will be described below. After step S1310, the process of step S1311 is executed.

In the SNS server 20, the controller 202 receives an information acquisition request from the communication terminal 10 by using the communicator 200. The controller 202 transmits information corresponding to the account and the address included in the information acquisition request to the communication terminal 10 by using the communicator 200.

(Step S1311)

The controller 102 updates image management information on the basis of the information acquired in step S1310. After step S1311, the process of step S1312 is executed.

(Step S1312)

The controller 102 determines whether or not information of all the SNSs is acquired. When information corresponding to all of the combinations of a service name, an account, and an address in image management information is received, the controller 102 determines that information of all the SNSs is acquired. In other cases, the controller 102 determines that information of some of the SNSs is not acquired. In step S1312, when the controller 102 determines that information of all the SNSs is acquired, the process of step S1313 is executed. In step S1312, when the controller 102 determines that information of some of the SNSs is not acquired, the process of step S1310 is executed.

A user may designate a service and an account and only information corresponding to the service and the account that are designated may be acquired.

(Step S1313)

The controller 102 displays a list of pieces of information constituting image management information on the display 105. An example of display in step S1313 will be described below. After step S1313, the process of step S1320 is executed.

(Step S1320)

In step S1310, information of an uploaded processed image is received. For example, a thumbnail of a processed image is received. In step S1313, a list of pieces of information of a processed image is displayed. For example, various kinds of information such as an uploaded article (text) and responses in an SNS are displayed. A user inputs an instruction for selecting an image uploaded to an SNS to the user interface 104 by selecting one of the pieces of information of a processed image displayed in step S1313. When a user inputs an instruction for selecting an image uploaded to an SNS to the user interface 104, the controller 102 accepts the instruction from the user. The controller 102 determines whether or not an instruction for selecting an image uploaded to an SNS is accepted. In step S1320, when the controller 102 determines that an instruction for selecting an image uploaded to an SNS is accepted, the process of step S1321 is executed. In step S1320, when the controller 102 determines that an instruction for selecting an image uploaded to an SNS is not accepted, the process of step S1340 is executed.

(Step S1321)

In step S1320, an instruction for selecting an image uploaded to an SNS is accepted. The controller 102 acquires information associated with information of a processed image corresponding to the instruction in image management information. In other words, the controller 102 reads information corresponding to the image selected in step S1320 from the storage medium 103. After step S1321, the process of step S1322 is executed.

(Step S1322)

The controller 102 displays the information read in step S1321 on the display 105. In other words, the controller 102 displays a list of pieces of information corresponding to the image selected in step S1320 on the display 105. An example of display in step S1322 will be described below. After step S1322, the process of step S1330 is executed.

(Step S1330)

When a user inputs an instruction for displaying a list of pieces of information of all the SNSs to the user interface 104, the controller 102 accepts the instruction from the user. The controller 102 determines whether or not an instruction for displaying a list of pieces of information of all the SNSs is accepted. In other words, the controller 102 determines whether or not the state of the display 105 is returned to the state in step S1313. In step S1330, when the controller 102 determines that an instruction for displaying a list of pieces of information of all the SNSs is accepted, the process of step S1331 is executed. In step S1330, when the controller 102 determines that an instruction for displaying a list of pieces of information of all the SNSs is not accepted, the determination of step S1330 is repeated.

(Step S1331)

When a user inputs an instruction for updating information of an SNS to the user interface 104, the controller 102 accepts the instruction from the user. The controller 102 determines whether or not an instruction for updating information of an SNS is accepted. In step S1331, when the controller 102 determines that an instruction for updating information of an SNS is accepted, the process of step S1332 is executed. In step S1331, when the controller 102 determines that an instruction for updating information of an SNS is not accepted, the process of step S1340 is executed.

(Step S1332)

The process similar to the process of step S1310 is executed in step S1332. After step S1332, the process of step S1333 is executed.

(Step S1333)

The process similar to the process of step S1311 is executed in step S1333. After step S1333, the process of step S1340 is executed.

(Step S1340)

When a user inputs an instruction for completing display to the user interface 104, the controller 102 accepts the instruction from the user. The controller 102 determines whether or not an instruction for completing display is accepted. In step S1340, when the controller 102 determines that an instruction for completing display is accepted, the process shown in FIG. 7 and FIG. 8 is completed. In step S1340, when the controller 102 determines that an instruction for completing display is not accepted, the process of step S1313 is executed.

The process of steps S1310 to S1312 is not essential. The process of steps S1310 to S1312 may be executed or may not be executed regardless of whether or not any other process is executed. The process of steps S1310 to S1312 may not be executed and a list of pieces of information included in image management information recorded on the storage medium 103 may be displayed in step S1313. The process of steps S1331 to S1333 is not essential. The process of steps S1331 to S1333 may be executed or may not be executed regardless of whether or not any other process is executed.

Figure 9:
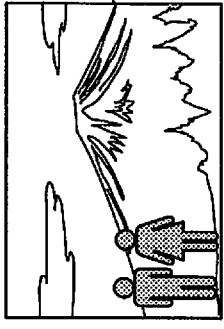
FIG. 9 is a diagram showing information displayed on a display according to the first embodiment of the present invention.

FIG. 9 and FIG. 10 show an example of information displayed on the display 105 in step S1313. Due to lack of space in figures, information that is displayed is distributed in two figures, but information shown in FIG. 9 and FIG. 10 may be simultaneously displayed on the display 105.

An original image 900 is an original image selected in step S102. Instead of an original image, a thumbnail of an original image may be displayed. Information is displayed for each service of an SNS and each account. In the example shown in FIG. 9 and FIG. 10, information associated with each of an account XXX of an SNS service 1, an account YYY of the SNS service 1, and an account ZZZ of an SNS service 2 is displayed.

SNS information 901, SNS information 902, and SNS information 903 represent a service name and an account of an SNS. The SNS information 901 represents the SNS service 1 and the account XXX. The SNS information 902 represents the SNS service 1 and the account YYY. The SNS information 903 represents the SNS service 2 and the account ZZZ.

An uploaded image 910 is a thumbnail of a processed image uploaded to the account XXX of the SNS service 1. An uploaded image 911 is a thumbnail of a processed image uploaded to the account YYY of the SNS service 1. An uploaded image 912 is a thumbnail of a processed image uploaded to the account ZZZ of the SNS service 2. Each of the uploaded images is generated in step S112. Various kinds of information recorded in step S126 as image management information include an uploaded image, i.e., a thumbnail of a processed image. A thumbnail of a processed image received in step S1310 may be displayed as the uploaded image 910.

Evaluation information 920, evaluation information 921, and evaluation information 922 represent the number of users who have evaluated each processed image as good. Evaluation information 923 represents the number of users who have given evaluation of the medium degree to a processed image. In a case where evaluation information is updated over time, the storage medium 103 stores a history of the evaluation information. Each piece of evaluation information is acquired in step S1310 and step S1332. Each piece of evaluation information is recorded as image management information in step S1311 and step S1333.

For example, the controller 102 receives first evaluation information from the SNS server 20 by using the communicator 100 at a first date and time. The controller 102 receives second evaluation information from the SNS server 20 by using the communicator 100 at a second date and time later than the first date and time. The first evaluation information and the second evaluation information that have been received are recorded on the storage medium 103 with the first date and time and the second date and time as image management information. The storage medium 203 of the SNS server 20 may store a history of evaluation information. The controller 102 may receive a history of evaluation information from the SNS server 20 by using the communicator 100.

Share information 930 and share information 931 represent the number of other users with whom a page of an SNS is shared. In a case where share information is updated over time, the storage medium 103 stores a history of the share information. Each piece of share information is acquired in step S1310 and step S1332. Each piece of share information is recorded as image management information in step S1311 and step S1333. The storage medium 203 of the SNS server 20 may store a history of share information.

A comment 940 and a comment 941 represent the texts written by other users for an article on a page of an SNS. In a case where comments are added over time, the storage medium 103 stores a history of the comments. Each comment is acquired in step S1310 and step S1332. Each comment is recorded as image management information in step S1311 and step S1333. The storage medium 203 of the SNS server 20 may store a history of comments.

An uploading date 950, an uploading date 951, and an uploading date 952 represent a date when a processed image is uploaded. Each uploading date is acquired when the process of step S123 is executed. Various kinds of information recorded as image management information in step S126 include an uploading date.

Image information 960 represents an image simultaneously uploaded with the uploading image 910. An image represented by the image information 960 is an image different from the uploading image 910. An image represented by the image information 960 may be an image that is not related to the original image 900. For example, the controller 102 uploads an image (third image) different from a processed image (second image) to a page of an SNS on which the processed image has been uploaded by transmitting the image to the SNS server 20 by using the communicator 100 in step S123. The controller 102 records image management information in which an original image, image processing information, an address, and information (third information) regarding an image simultaneously uploaded with a processed image are associated with each other onto the storage medium 103 in step S126.

For example, information regarding an image simultaneously uploaded with a processed image is information that identifies the image. For example, the information is a file name of the image.

In a case where an image simultaneously uploaded with a processed image is a processed image, image management information including image processing information corresponding to the image has been recorded on the storage medium 103. For this reason, the communication terminal 10 can identify image processing that has been performed on an image simultaneously uploaded with a processed image. For example, when a user designates a second processed image simultaneously uploaded with a first processed image, the communication terminal 10 reads image processing information associated with the second processed image from the storage medium 103. The image processing information is displayed on the display 105, and thus a user can confirm the content of image processing of the second processed image.

TAG information 970 represents a label of a page of an SNS. For example, the TAG information 970 represents an account of another user. The TAG information 970 may be a text that represents the content of an uploaded image and the like. The TAG information 970 may be the kind of an article. The controller 102 or the controller 202 generate TAG information.

For example, after step S112, the controller 102 generates TAG information associated with a processed image (second image). The controller 102 transmits TAG information to the SNS server 20 in step S123. In other words, when a processed image is uploaded, the controller 102 transmits TAG information. Alternatively, the controller 102 receives TAG information associated with a processed image (second image) from the SNS server 20 by using the communicator 100 in step S125. In other words, when a processed image is uploaded, the controller 102 receives TAG information. The controller 102 records image management information in which an original image, image processing information, an address, and TAG information are associated with each other onto the storage medium 103 in step S126. Alternatively, TAG information is acquired in step S1310 and step S1332. TAG information is recorded as image management information in step S1311 and step S1333.

In this way, the communication terminal 10 can identify image processing on the basis of TAG information. For example, when a user designates TAG information, the communication terminal 10 reads image processing information associated with the TAG information from the storage medium 103. For example, when the TAG information 970 shown in FIG. 9 is designated, image processing information associated with a predetermined user is read. Image processing information is displayed on the display 105, and thus a user can confirm the content of image processing for an image to which predetermined TAG information is added.

In the SNS server 20, the controller 202 receives TAG information from the communication terminal 10 by using the communicator 200. Alternatively, the controller 202 generates TAG information on the basis of a processed image. The controller 202 associates TAG information with a processed image and records the TAG information on the storage medium 203. The controller 202 reads TAG information from the storage medium 203. The controller 202 transmits the read TAG information to the communication terminal 10 by using the communicator 200.

A personal recognition result 980 represents a person detected from an uploaded processed image. In the SNS server 20, the image processing unit 201 performs face recognition processing on a processed image and detects a face of a person. The controller 202 associates a personal recognition result that represents a detected person with a processed image and records the personal recognition result on the storage medium 203. A personal recognition result may include information of a person detected through face recognition processing and position information of the person in a processed image. When an information acquisition request is received from the communication terminal 10, the controller 202 transmits a personal recognition result corresponding to an account and an address included in the information acquisition request to the communication terminal 10 by using the communicator 200.

The controller 102 receives a personal recognition result (second information) associated with a processed image (second information) by the SNS server 20 from the SNS server 20 by using the communicator 100 in step S125. In other words, when a processed image is uploaded, the controller 102 receives a personal recognition result. The controller 102 records image management information in which an original image, image processing information, an address, and a personal recognition result are associated with each other onto the storage medium 103 in step S126. Alternatively, a personal recognition result is acquired in step S1310 and step S1332. A personal recognition result is recorded as image management information in step S1311 and step S1333.

In this way, the communication terminal 10 can identify image processing on the basis of a personal recognition result. For example, when a user designates a personal recognition result, the communication terminal 10 reads an image and image processing information associated with the personal recognition result from the storage medium 103. Image processing information is displayed on the display 105, and thus a user can confirm the content of image processing for an image on which a predetermined person is seen.

Image management information includes at least one of TAG information and a personal recognition result. Image management information may not include TAG information and a personal recognition result.

Information including an image and an article uploaded to the account XXX of the SNS service 1 is displayed in an area 1000. Information including an image and an article uploaded to the account YYY of the SNS service 1 is displayed in an area 1001. Information including an image and an article uploaded to the account ZZZ of the SNS service 2 is displayed in an area 1002.

Only the area 1000 will be described. The area 1000 includes an image 1010, an article 1020 (text), a comment 1030, evaluation information 1040, and share information 1050. The image 1010 includes an uploaded image 1011.

FIG. 11 shows an example of information displayed on the display 105 in step S1322.

An uploaded image 1100, an upload destination 1101, and an account 1102 are displayed. The upload destination 1101 represents a service to which a processed image has been uploaded. The account 1102 represents an account to which a processed image has been uploaded.

Evaluation information 1110, share information 1111, and a comment 1112 are displayed. The evaluation information 1110 includes evaluation information at a plurality of times. The share information 1111 includes share information at a plurality of times. An uploaded date 1115 is displayed.

Image processing information 1120 identifies image processing performed on an original image. In a case where a plural kinds of image processing are performed on an original image, image management information includes image processing information corresponding to each of the plural kinds of image processing. In the example shown in FIG. 11, the image processing information 1120 includes a trimming area, a parameter of exposure correction, and the kind of white balance correction. In addition, the image processing information 1120 includes the kind of picturesque filtering and the image size in resolution conversion (resizing).

Image information 1130 that represents an image simultaneously uploaded with a processed image is displayed. Meta information setting 1140 is displayed. The meta information setting 1140 represents whether or not meta information has been deleted from a processed image. In the example shown in FIG. 11, the meta information setting 1140 represents that position information is not deleted from a processed image and is inserted in the processed image. In addition, in the example shown in FIG. 11, the meta information setting 1140 represents that information of the camera 30 used for photographing has been deleted.

Server image processing information 1150 identifies image processing performed on a processed image (second image) by the SNS server 20. In the SNS server 20, the controller 202 outputs a processed image received from the communication terminal 10 to the image processing unit 201 and requests image processing for the processed image to the image processing unit 201. For example, at a time of uploading, the controller 202 requests image processing for a processed image received from the communication terminal 10 to the image processing unit 201 according to a request from a user, i.e., an instruction from the communication terminal 10. The image processing unit 201 performs image processing on a processed image. The image processing unit 201 outputs a processed image processed by the image processing unit 201 and server image processing information corresponding to the image processing performed on the processed image to the controller 202. The controller 202 transmits server image processing information to the communication terminal 10 by using the communicator 200.

The controller 102 receives server image processing information from the SNS server 20 by using the communicator 100 in step S125. The controller 102 records image management information in which an original image, image processing information, an address, and server image processing information are associated with each other onto the storage medium 103 in step S126. Alternatively, server image processing information is acquired in step S1310 and step S1332. Server image processing information is recorded as image management information in step S1311 and step S1333.

In this way, the communication terminal 10 can easily manage information of image processing performed in the SNS server 20 in addition to image processing performed in the communication terminal 10.

A personal recognition result 1160, TAG information 1170, and an uploaded article 1180 are displayed.

FIG. 12 shows image management information 1200. The image management information 1200 is an example of image management information. The image management information 1200 includes a service name, an account, an address, and an uploading date. The image management information 1200 also includes information of an image simultaneously uploaded with a processed image. The image management information 1200 also includes image processing information, a thumbnail of a processed image, an article, meta information setting, server image processing information, a personal recognition result, and TAG information. The image management information 1200 also includes evaluation information, share information, and a comment. Information constituting the image management information 1200 may be added to an original image as Exif information. Image management information including a processed image to which the Exif information is added may be recorded on the storage medium 103. In a case where there are a plurality of accounts for the same service as shown in FIG. 12, image management information can be managed for each account.

An image management method according to a first aspect of the present invention is based on the operation shown in FIG. 4 and FIG. 5. The image management method according to the first aspect includes an image acquisition step, an image generation step, an uploading step, and a recording step. In the image acquisition step (step S111), a first image (original image) is acquired. In the image generation step (step S112), a second image (processed image) is generated by performing image processing on the first image. In the uploading step (step S123), the second image is uploaded to a page of an SNS by transmitting the second image to the SNS server 20. In the recording step (step S126), image management information in which the first image, image processing information that identifies the image processing, and an address of the page of the SNS are associated with each other is recorded onto the storage medium 103.

In the aspect shown in FIG. 4 and FIG. 5, the image generation step and the uploading step are sequentially continuously executed. After the image generation step is executed a plurality of times in advance, a processed image on which image processing has been performed may be selected and the selected processed image may be uploaded.

An image management method according to the first aspect of the present invention may not include a process other than the process corresponding to the above-described steps.

In the first embodiment, image management information in which an original image, image processing information that identifies image processing performed on the original image, and an address of a page of an SNS are associated with each other is recorded onto the storage medium 103. For this reason, the communication terminal 10 can easily manage information of image processing that has been performed on each image and reduce the capacity of the storage medium 103 necessary for management of image processing.

Leakage of confidential information can be avoided by deleting meta information included in a processed image.

Image management information includes a personal recognition result or TAG information associated with a processed image, and thus the communication terminal 10 can identify image processing performed on an image corresponding to the personal recognition result or the TAG information.

Image management information corresponding to each of a plurality of SNSs is recorded onto the storage medium 103, and thus the communication terminal 10 can easily manage information of image processing that has been performed on an image corresponding to each of the plurality of SNSs.

Image management information corresponding to each of a plurality of accounts in an SNS is recorded onto the storage medium 103, and thus the communication terminal 10 can easily manage information of image processing that has been performed on an image corresponding to each of the plurality of accounts.

Image management information corresponding to each of a plurality of addresses in an SNS is recorded onto the storage medium 103, and thus the communication terminal 10 can easily manage information of image processing that has been performed on an image corresponding to each of the plurality of addresses.

Information regarding an image simultaneously uploaded with a processed image is recorded onto the storage medium 103, and thus the communication terminal 10 can identify image processing performed on the image on the basis of the information.

Server image processing information that identifies image processing performed on a processed image by the SNS server 20 is recorded onto the storage medium 103, and thus the communication terminal 10 can easily manage information of image processing performed in the SNS server 20 in addition to image processing performed in the communication terminal 10.

First Modified Example of First Embodiment

In a first modified example of the first embodiment of the present invention, image processing similar to that which is performed on a predetermined original image is performed on another original image.

The process shown in FIG. 7 and FIG. 8 is changed to the process shown in FIG. 13, FIG. 14, FIG. 15, and FIG. 16. In terms of the process shown in FIGS. 13 to 16, differences from the process shown in FIG. 7 and FIG. 8 will be described.

(Step S1350)

After step S1322, the process of step S1350 is executed. When a user inputs an instruction for generating a new image on which image processing similar to that which is performed on the image selected in step S1320 is performed to the user interface 104, the controller 102 accepts the instruction from the user. The controller 102 determines whether or not an instruction for generating a new image on which image processing similar to that which is performed on the selected image is performed is accepted. In step S1350, when the controller 102 determines that an instruction for generating a new image on which image processing similar to that which is performed on the selected image is performed is accepted, the process of step S1351 is executed. In step S1350, when the controller 102 determines that an instruction for generating a new image on which image processing similar to that which is performed on the selected image is performed is not accepted, the process of step S1340 is executed.

(Step S1351)

The controller 102 reads image processing information associated with the processed image selected in step S1320 from the storage medium 103. At this time, the service name, the account, and the address acquired in step S1310 and image processing information corresponding to an original image associated with them are read. After step S1351, the process of step S1360 is executed.

(Step S1360)

A user inputs an instruction for designating an image that is a subject for image processing to the user interface 104. When a user inputs an instruction for designating an image that is a subject for image processing to the user interface 104, the controller 102 accepts the instruction from the user. The controller 102 determines whether or not an instruction for designating the original image selected in step S102 is accepted. In step S1360, when the controller 102 determines that an instruction for designating the original image selected in step S102 is accepted, the process of step S1370 is executed. In step S1360, when the controller 102 determines that an instruction for designating the original image selected in step S102 is not accepted, the process of step S1362 is executed.

(Step S1362)

The controller 102 designates an image that is a subject for processing on the basis of the instruction accepted in step S1360. In other words, a user designates an original image other than the original image selected in step S102 as a subject for processing. An original image recorded on the storage medium 103 as part of image management information is designated as a subject for processing. A new original image may be acquired from the camera 30 and the original image may be designated as a subject for processing. After step S1362, the process of step S1370 is executed.

(Step S1370)

A user inputs an instruction for changing or adding image processing to the user interface 104. When a user inputs an instruction for changing or adding image processing to the user interface 104, the controller 102 accepts the instruction from the user. The controller 102 determines whether or not an instruction for changing or adding image processing is accepted. In step S1370, when the controller 102 determines that an instruction for changing or adding image processing is accepted, the process of step S1371 is executed. In step S1370, when the controller 102 determines that an instruction for changing or adding image processing is not accepted, the process of step S1372 is executed.

(Step S1371)

When a user desires change or addition of image processing, change or addition of image processing is set for the image processing information read in step S1351. In this way, image processing information is updated. Some of parameters of image processing represented by image processing information may be changed. In order for a user to confirm effects of image processing, an image on which image processing that is tentatively set has been performed may be displayed, which is not shown in the figures. In this way, a user can easily distinguish and change the content of image processing.

(Step S1372)

The controller 102 reads the original image selected in step S102 or the original image that is a subject for processing selected in step S1362 from the storage medium 203. The controller 102 outputs the read original image and the image processing information read in step S1351 to the image processing unit 101, and requests image processing for the original image to the image processing unit 101. When image processing is changed or added in step S1371, image processing information updated through the change or addition is output to the image processing unit 101. The image processing unit 101 generates a processed image by performing image processing on the original image on the basis of the image processing information. The image processing unit 101 outputs the generated processed image and the image processing information corresponding to the image processing performed on the original image to the controller 102. The image processing unit 101 may generate a thumbnail of a processed image in addition to the processed image. After step S1372, the process of step S1373 is executed.

For example, when a resolution is changed by setting the resolution to a higher resolution in step S1371, the image processing unit 101 can set a resolution higher than that of image processing represented by the image processing information read in step S1351 and perform resolution conversion in step S1372. When a trimming area is changed in step S1371, the image processing unit 101 can set a range different from that set in the image processing represented by the image processing information read in step S1351 and perform trimming in step S1372. In this way, the image processing unit 101 can perform image processing different from that represented by the image processing information read in step S1351 on an original image that is a subject for processing in step S1372.

When the process of step S1371 is not executed, image processing is performed in step S1372 on the basis of the image processing information read in step S1351.

(Step S1373)

The controller 102 associates a processed image with an original image and image processing information. Image processing information identifies the image processing performed in step S1372. The controller 102 temporarily stores a processed image, an original image, and image processing information onto the storage medium 103. After step S1373, the process of step S1380 is executed.

(Step S1380)

When a user inputs an instruction for uploading a processed image to the user interface 104, the controller 102 accepts the instruction from the user. The controller 102 determines whether or not an instruction for uploading a processed image is accepted. In step S1370, when the controller 102 determines that an instruction for uploading a processed image is accepted, the process of step S1390 is executed. In step S1370, when the controller 102 determines that an instruction for uploading a processed image is not accepted, the process of step S1340 is executed.

(Step S1390)

When a user inputs an instruction for applying image processing similar to that which is performed on the image selected in step S1320 by the SNS server 20 to the user interface 104, the controller 102 accepts the instruction from the user. The controller 102 determines whether or not an instruction for applying image processing similar to that which is performed on the selected image by the SNS server 20 is accepted. In step S1390, when the controller 102 determines that an instruction for applying image processing similar to that which is performed on the selected image by the SNS server 20 is accepted, the process of step S1391 is executed. In step S1390, when the controller 102 determines that an instruction for applying image processing similar to that which is performed on the selected image by the SNS server 20 is not accepted, the process of step S1392 is executed.

(Step S1391)

The controller 102 reads server image processing information associated with the processed image selected in step S1320 from the storage medium 103. After step S1391, the process of step S1392 is executed.

(Step S1392)

For example, a user inputs an instruction for designating a service and an account of an upload destination of a processed image to the user interface 104. The controller 102 accepts the instruction from the user. The controller 102 selects a service and an account of an upload destination of a processed image on the basis of the instruction. After step S1392, the process of step S1393 is executed. After step S1392, meta information may be deleted from a processed image through a process similar to the process of step S121.

(Step S1393)

The controller 102 transmits a processed image and information of an account to the SNS server 20 corresponding to the service selected in step S1392 by using the communicator 100. In this way, the controller 102 uploads a processed image on a page of an SNS. When the process of step S1391 is executed, the controller 102 transmits the server image processing information read in step S1391 to the SNS server 20 by using the communicator 100 in addition to a processed image and information of an account. After step S1393, the process of step S1394 is executed.

In the SNS server 20, the controller 202 receives a processed image and information of an account from the communication terminal 10 by using the communicator 200. The controller 202 associates a processed image with an account and records the processed image on the storage medium 203. At this time, the controller 202 records a processed image on a location represented by a predetermined address in the storage medium 203.

When the process of step S1391 is executed, the controller 202 receives server image processing information from the communication terminal 10 by using the communicator 200 in addition to a processed image and information of an account. The controller 202 outputs a processed image and server image processing information to the image processing unit 201 and requests image processing for the processed image to the image processing unit 201. The image processing unit 201 performs image processing on a processed image on the basis of server image processing information. For example, the image processing unit 201 performs the same image processing as that which is represented by server image processing information on a processed image. The image processing unit 201 may change some of parameters of image processing represented by server image processing information and perform image processing by using the changed parameters. The image processing unit 201 outputs a processed image on which image processing has been performed to the controller 202. The controller 202 associates a processed image with an account and records the processed image onto the storage medium 203.

In step S1393, a processed image on a page of an SNS may be replaced by a new processed image. In this case, image management information regarding an old processed image may be deleted.

The process of steps S1394 to S1397 is similar to the process of steps S124 to S127. After step S1397, the process of step S1331 is executed.

In terms of points other than the above, the process shown in FIGS. 13 to 16 is similar to the process shown in FIG. 7 and FIG. 8.

The controller 102 records image management information in which an original image (first image), image processing information, an address, and a thumbnail (fourth information) regarding a processed image (second image) are associated with each other onto the storage medium 103 in step S1396. The controller 102 displays one or more thumbnails on the display 105 in step S1313. The controller 102 accepts designation of any one of the thumbnails displayed on the display 105 in step S1320. The image processing unit 101 performs image processing on an original image associated with the designated thumbnail on the basis of image processing information associated with the designated thumbnail in step S1361.

The controller 102 may accept designation of an address in step S1320. Designation of a page of an SNS may be accepted, and thus designation of an address may be accepted. In this case, the controller 102 reads image processing information associated with the processed image selected in step S1320 from the storage medium 103 in step S1321. The image processing unit 101 performs image processing on an original image (first image) associated with the address accepted by the controller 102 on the basis of image processing information associated with the address accepted by the controller 102 in step S1361.

The process of step S1370 and step S1371 is not essential. The process of step S1370 and step S1371 may be executed or may not be executed regardless of whether or not any other process is executed. The process of step S1390 and step S1391 is not essential. The process of step S1390 and step S1391 may be executed or may not be executed regardless of whether or not any other process is executed. The process of step S1395 and step S1397 is not essential. The process of step S1395 and step S1397 may be executed or may not be executed regardless of whether or not any other process is executed.

In a case where a file name of a processed image is changed, a user sometimes cannot distinguish a processed image on which a predetermined image processing has been performed. Alternatively, a plurality of processed images are sometimes generated by performing different image processing on an original image a plurality of times. Alternatively, a processed image on which predetermined image processing has been performed sometimes disappears by deleting the processed image. In the first modified example of the first embodiment, when a processed image is selected by a user, image processing is performed on an original image on the basis of image processing information associated with a thumbnail of the processed image. Alternatively, when an address is selected by a user, image processing is performed on an original image on the basis of image processing information associated with the address. In this way, the communication terminal 10 can acquire a processed image similar to that which is uploaded to a page of an SNS. In addition, the communication terminal 10 can also acquire a high-resolution image on which almost the same image processing as that which is performed on a processed image uploaded to a page of an SNS has been performed by executing the process of step S1371.

When an image is uploaded to a page of an SNS, the image sometimes automatically turns into a low-resolution image. The communication terminal 10 can perform image processing on an original image by using image processing information. In other words, the communication terminal 10 can generate a high-resolution image again by performing image processing almost similar to that which is performed on a processed image uploaded to a page of an SNS on an original image.

Second Modified Example of First Embodiment

In a second modified example of the first embodiment of the present invention, the difference between a processed image generated in the communication terminal 10 and a processed image on which image processing has been performed by the SNS server 20 is recorded on the storage medium 103.

Figure 17:
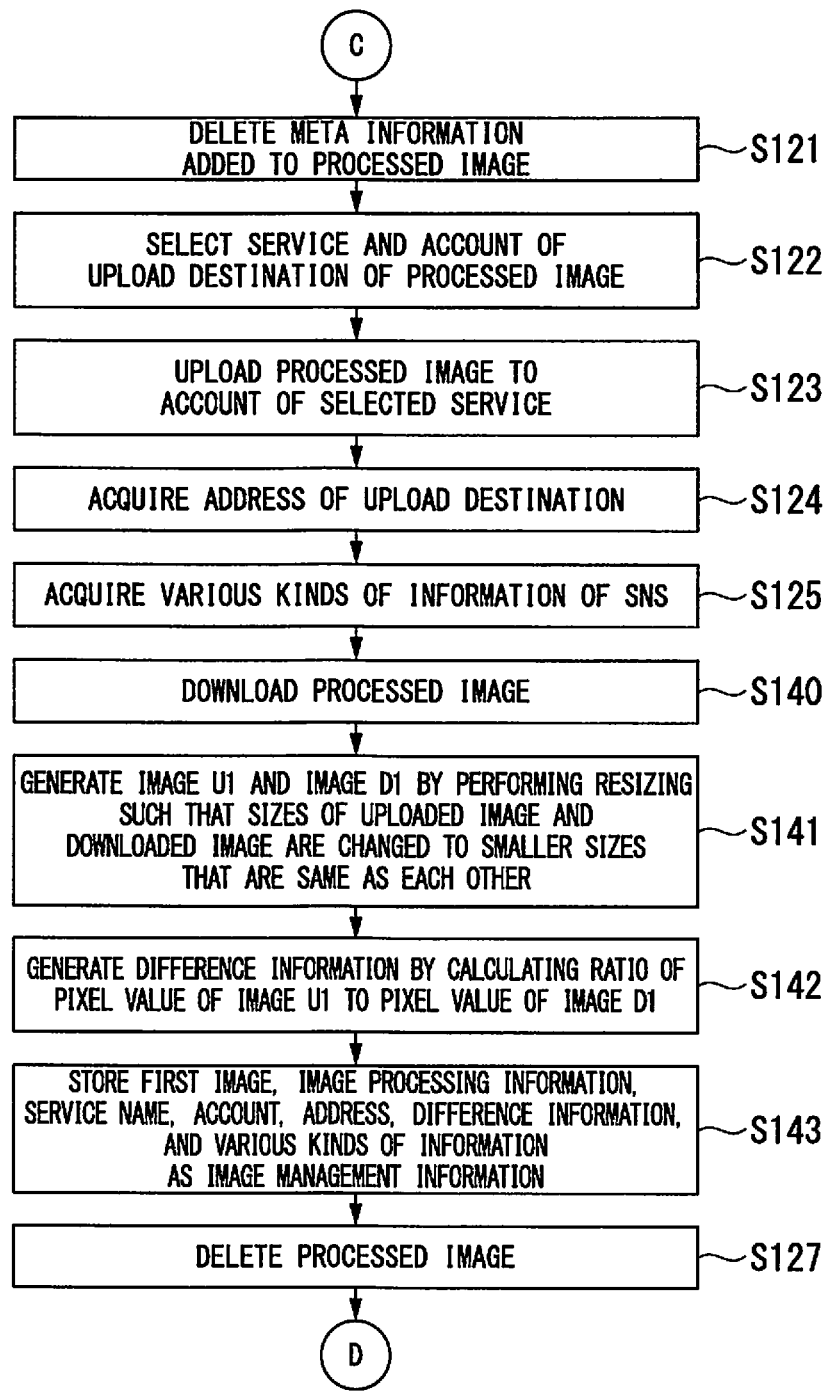
FIG. 17 is a flow chart showing a procedure of a process executed by a communication terminal according to a second modified example of the first embodiment of the present invention.

The process shown in FIG. 5 is changed to the process shown in FIG. 17. In terms of the process shown in FIG. 17, differences from the process shown in FIG. 5 will be described.

(Step S140)

After step S125, the process of step S140 is executed. The controller 102 transmits an acquisition request of a processed image to the SNS server 20 by using the communicator 100. An acquisition request of a processed image includes the address acquired in step S124. The controller 102 downloads a processed image by receiving the processed image from the SNS server 20 by using the communicator 100. After step S140, the process of step S141 is executed.

In the SNS server 20, the controller 202 receives an acquisition request of a processed image from the communication terminal 10 by using the communicator 200. The controller 202 reads a processed image from a location represented by an address included in an acquisition request of a processed image in the storage medium 203. The controller 202 transmits the read processed image to the communication terminal 10 by using the communicator 200.

(Step S141)

The controller 102 outputs a first processed image uploaded in step S123 and a processed image downloaded in step S140 to the image processing unit 101. In addition, the controller 102 requests image processing for a first processed image and a second processed image to the image processing unit 101. The image processing unit 101 performs resizing by changing the sizes of a first processed image and a second processed image to smaller sizes that are the same as each other. In this way, the image processing unit 101 generates an image U1 from a first processed image and an image D1 from a second processed image. After step S141, the process of step S142 is executed.

(Step S142)

The image processing unit 101 calculates a ratio of a pixel value of the image U1 to a pixel value of the image D1. For example, the image processing unit 101 divides a pixel value of the image D1 by a pixel value of the image U1 for a pixel of the same position in the image U1 and the image D1. The image processing unit 101 generates difference information by calculating a ratio of a pixel value for each of all the pixels of the image U1 and the image D1. Difference information includes all the ratios of a pixel value of the image U1 and the image D1. Difference information may include a ratio of a pixel value for each area of the image U1 and the image D1. For example, a pixel value for each area is a pixel value of the center position of an area. A pixel value for each area may be the average value of pixel values or the like for pixels included in an area. After step S142, the process of step S143 is executed.

(Step S143)

The controller 102 records image management information in which an original image, image processing information, a service name, an account, an address, difference information, and various kinds of information are associated with each other onto the storage medium 103. After step S143, the process of step S127 is executed.

In terms of points other than the above, the process shown in FIG. 17 is similar to the process shown in FIG. 5.

The controller 102 receives a second image on which image processing has been performed by the SNS server 20 from the SNS server 20 by using the communicator 100 in step S140. The controller 102 generates difference information in step S142. Difference information represents the difference between a second image on which image processing has been performed by the image processing unit 101 and a second image on which image processing has been performed by the SNS server 20. The controller 102 records image management information in which a first image, image processing information, an address, and difference information are associated with each other onto the storage medium 103 in step S143.

The controller 102 may display difference information on the display 105. A user can confirm the content of image processing performed on a processed image in the SNS server 20. For example, a user can confirm the brightness difference of a processed image between before and after exposure correction is performed in the SNS server 20.

The image processing unit 101 may perform image processing based on difference information on a processed image associated with the difference information. In this way, the communication terminal 10 can acquire a processed image similar to that on which image processing has been performed by the SNS server 20.

Third Modified Example of First Embodiment

In a third modified example of the first embodiment of the present invention, image processing similar to that which is performed on a predetermined original image is performed on another original image. A user selects image processing on the basis of evaluation information.

Figure 13:
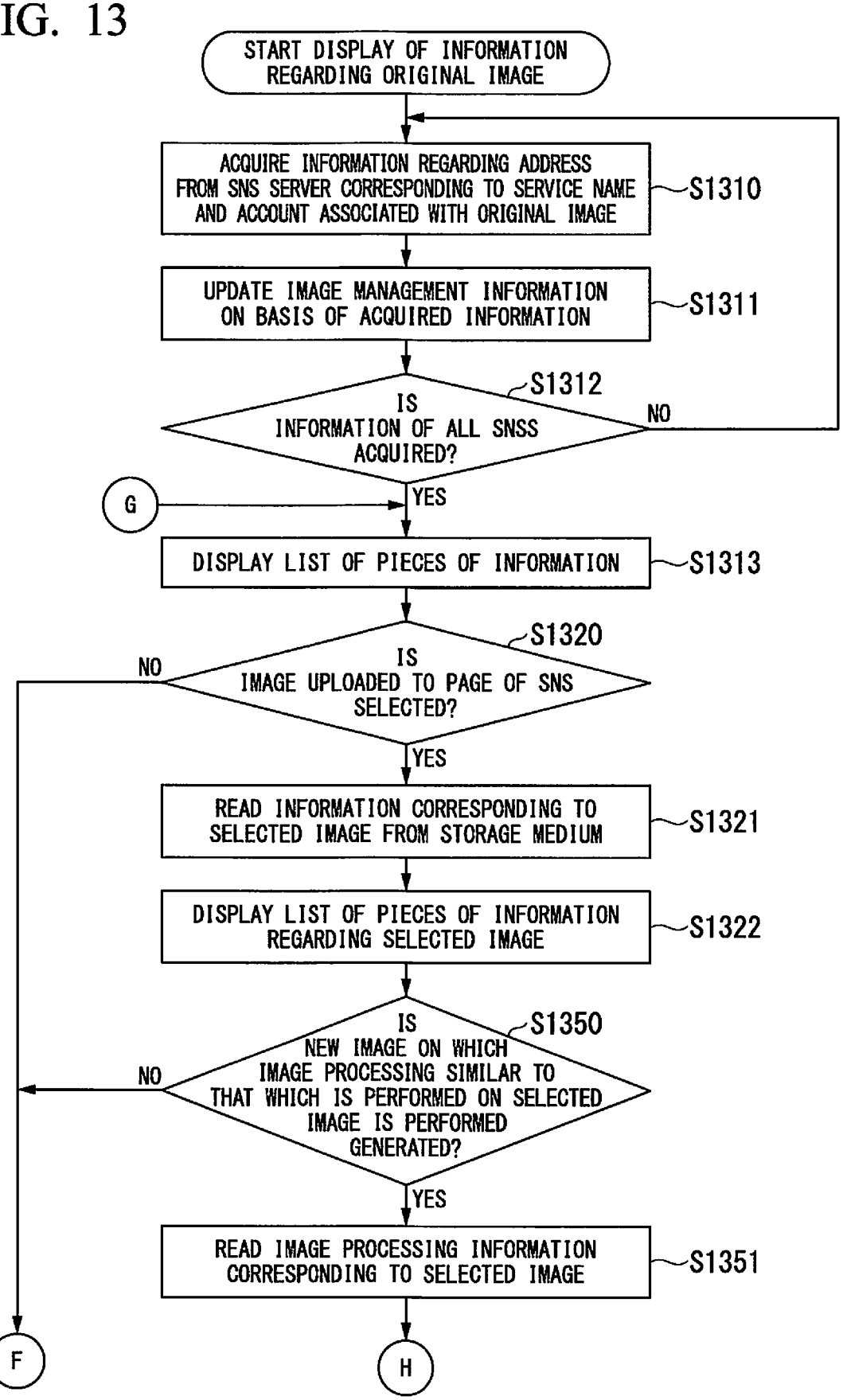
FIG. 13 is a flow chart showing a procedure of a process executed by a communication terminal according to a first modified example of the first embodiment of the present invention.
Figure 14:
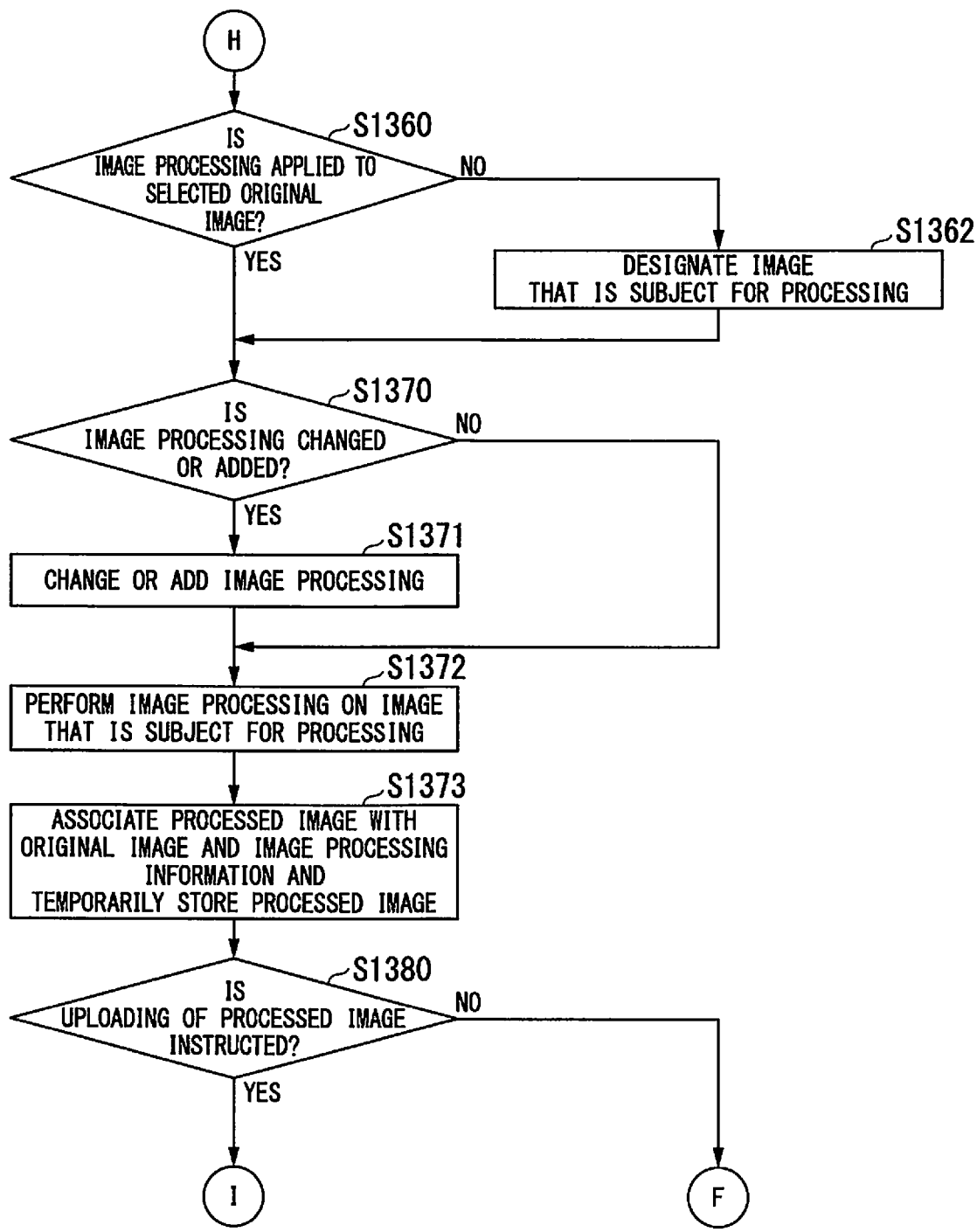
FIG. 14 is a flow chart showing a procedure of a process executed by the communication terminal according to the first modified example of the first embodiment of the present invention.
Figure 15:
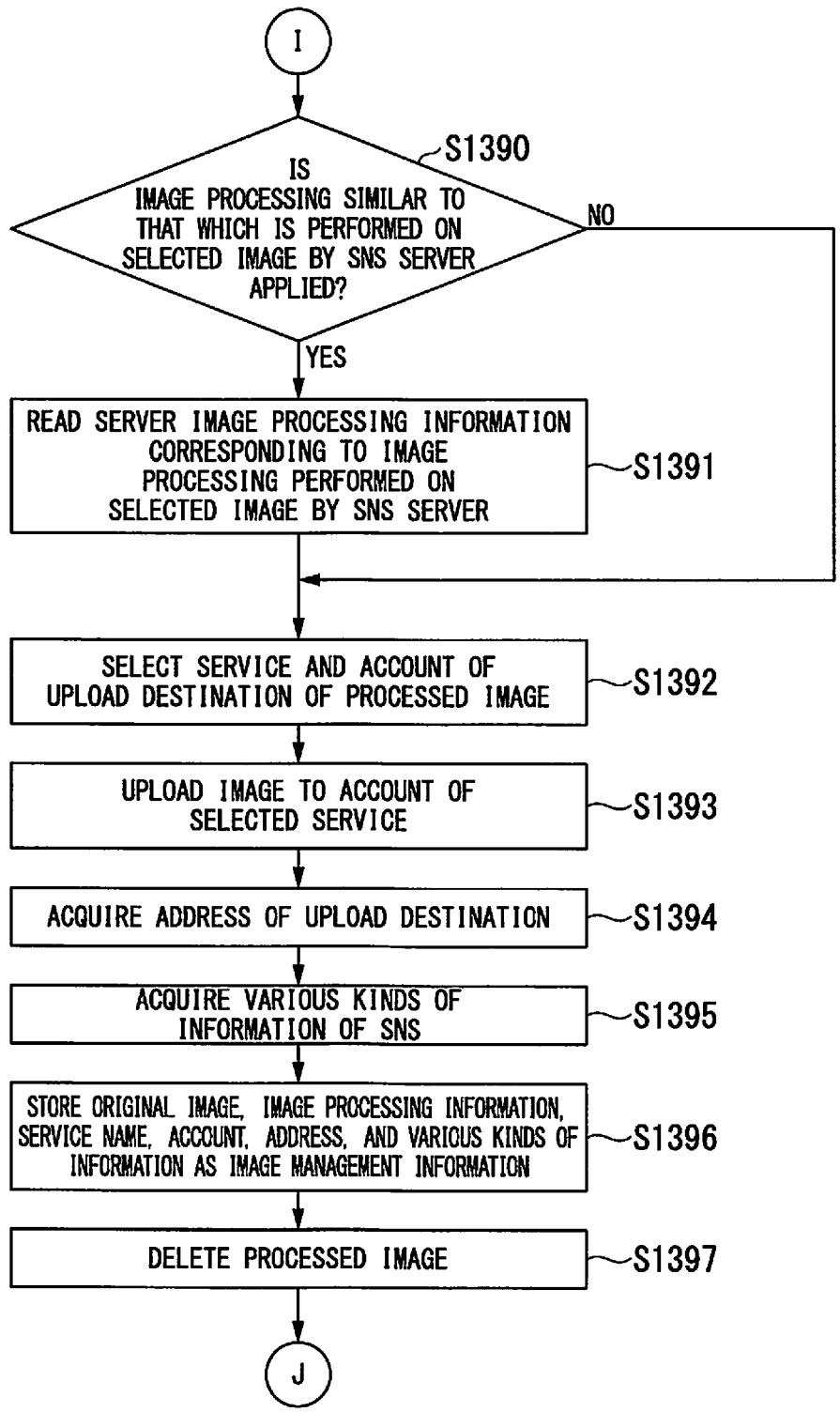
FIG. 15 is a flow chart showing a procedure of a process executed by the communication terminal according to the first modified example of the first embodiment of the present invention.
Figure 16:
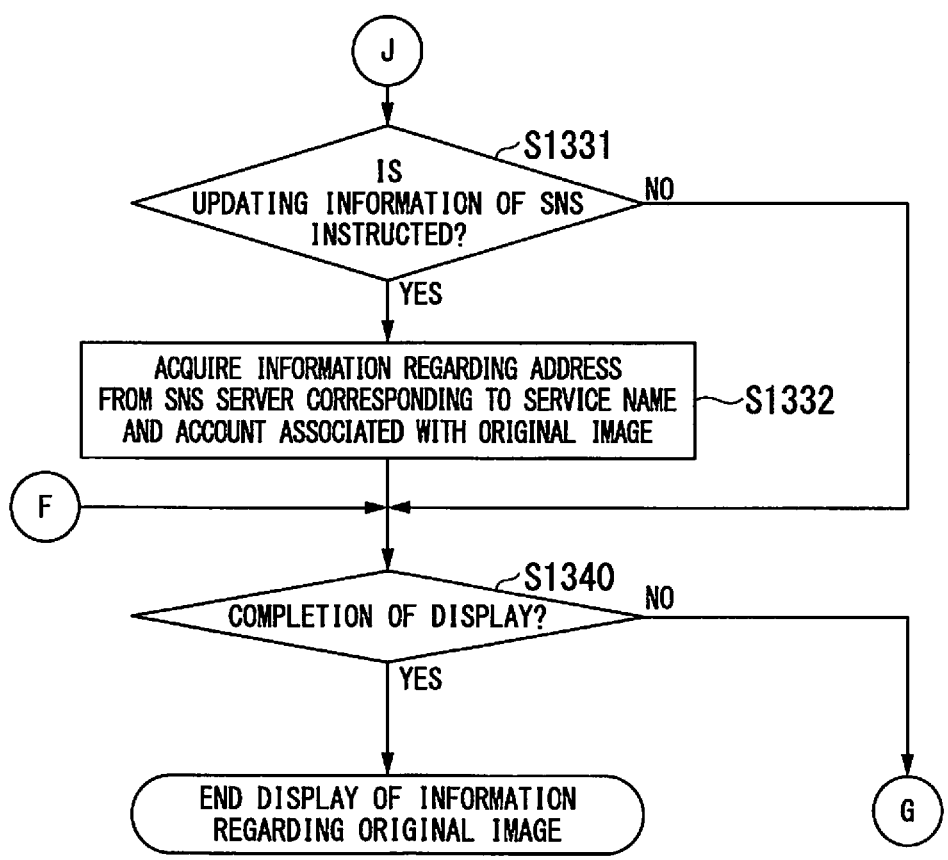
FIG. 16 is a flow chart showing a procedure of a process executed by the communication terminal according to the first modified example of the first embodiment of the present invention.
Figure 18:
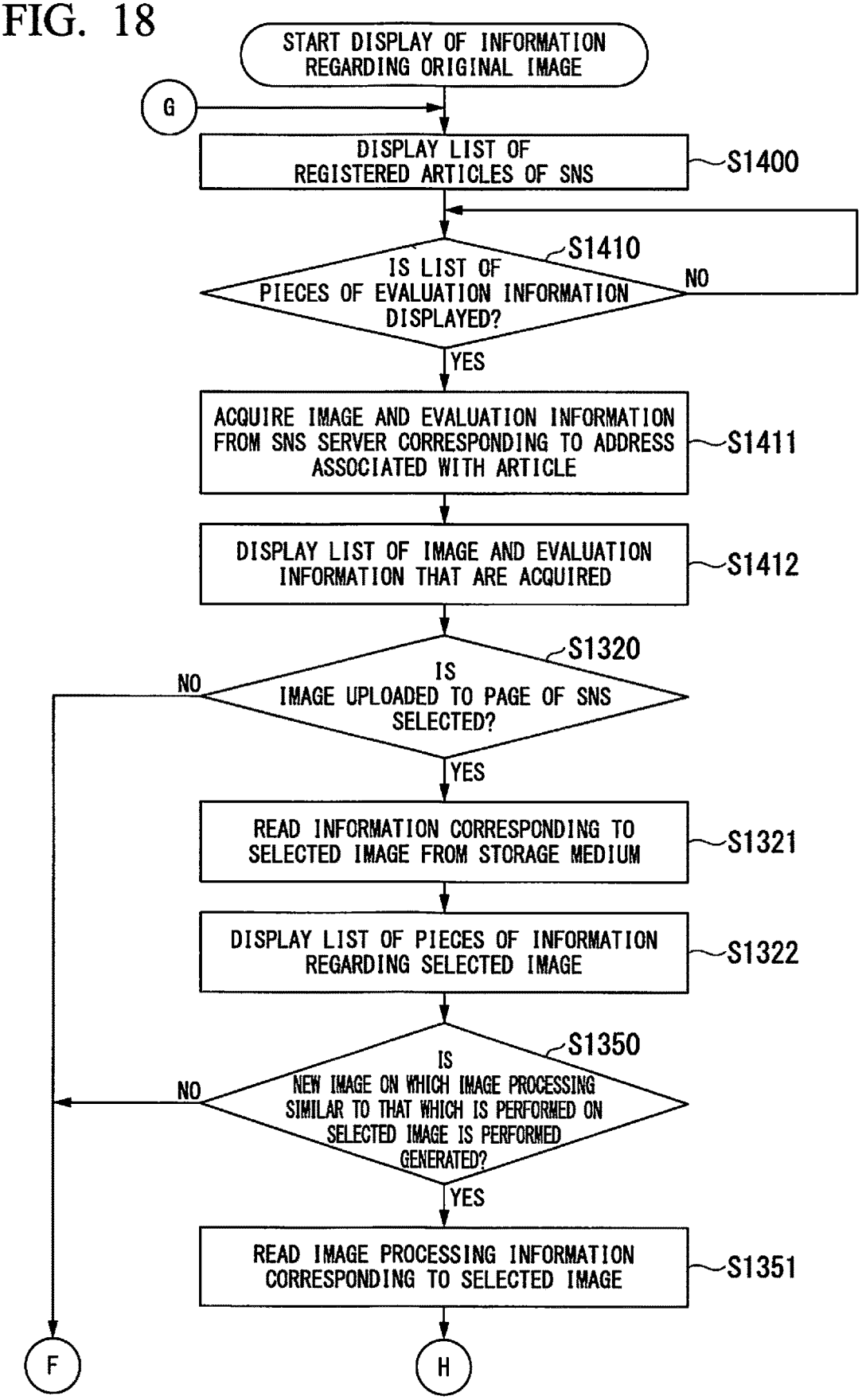
FIG. 18 is a flow chart showing a procedure of a process executed by a communication terminal according to a third modified example of the first embodiment of the present invention.

The process shown in FIG. 13 is changed to the process shown in FIG. 18. In terms of the process shown in FIG. 18, differences from the process shown in FIG. 13 will be described. An application that uses information of a plurality of SNSs may execute the process shown in FIG. 18.

(Step S1400)

The controller 102 reads all the articles recorded as image management information from the storage medium 103. Articles may be acquired from the SNS server 20. The controller 102 displays a list of the read articles of an SNS on the display 105. After step S1400, the process of step S1401 is executed.

(Step S1410)

When a user inputs an instruction for displaying a list of pieces of evaluation information to the user interface 104, the controller 102 accepts the instruction from the user. The controller 102 determines whether or not an instruction for displaying a list of pieces of evaluation information is accepted. In step S1410, when the controller 102 determines that an instruction for displaying a list of pieces of evaluation information is accepted, the process of step S1411 is executed. In step S1410, when the controller 102 determines that an instruction for displaying a list of pieces of evaluation information is not accepted, the determination of step S1410 is repeated.

(Step S1411)

The controller 102 acquires a service name, an account, and an address associated with an article in image management information. The controller 102 transmits an information acquisition request to the SNS server 20 corresponding to the service name and the account that are acquired by using the communicator 100. An information acquisition request includes an address. The controller 102 acquires an image displayed with an article and evaluation information by receiving the image and the evaluation information from the SNS server 20. A history of evaluation information may be acquired. Evaluation information is updated day by day. When evaluation information is acquired, a history of evaluation information may be acquired by recording a timing of the acquisition and evaluation information. The above-described process is executed for each of a plurality of articles. After step S1411, the process of step S1412 is executed.

In the SNS server 20, the controller 202 receives an information acquisition request from the communication terminal 10 by using the communicator 200. The controller 202 transmits an image and evaluation information corresponding to an account and an address included in the information acquisition request to the communication terminal 10 by using the communicator 200.

(Step S1412)

The controller 102 displays a list of the image and the evaluation information acquired in step S1411 on the display 105. After step S1412, the process of step S1320 is executed.

In terms of points other than the above, the process shown in FIG. 18 is similar to the process shown in FIG. 13.

Evaluation information represents the number of users who have evaluated a processed image uploaded to a page of an SNS as good. In step S1320, a user can select an image with reference to evaluation information. For example, a user can select an image that is highly evaluated. In other words, a user can select image processing performed on an original image on the basis of evaluation information.

Second Embodiment

Figure 19:
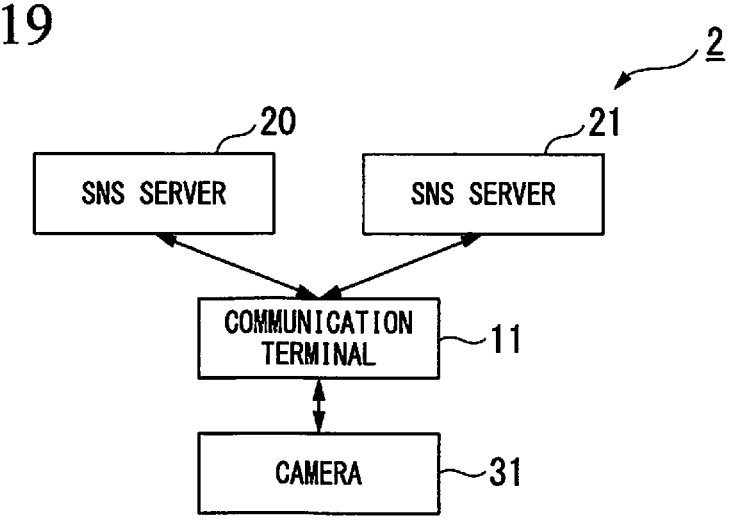
FIG. 19 is a block diagram showing a configuration of an image management system according to a second embodiment of the present invention.

FIG. 19 shows a configuration of an image management system 2 according to a second embodiment of the present invention. In FIG. 19, the communication terminal 10 in the image management system 1 shown in FIG. 1 is changed to a communication terminal 11. In FIG. 19, the camera 30 in the image management system 1 shown in FIG. 1 is changed to a camera 31. The communication terminal 11 and the camera 31 constitute an image uploading system.

Figure 20:
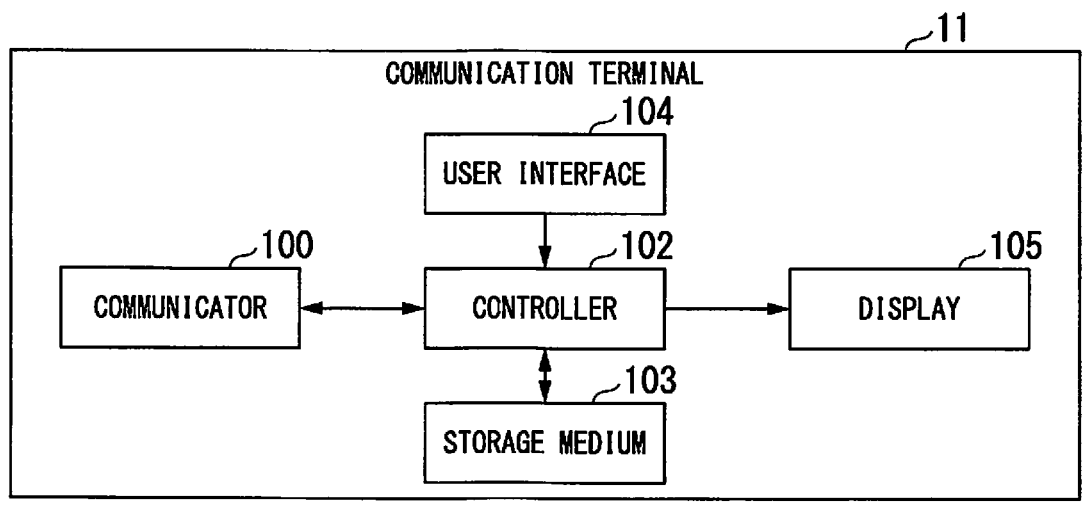
FIG. 20 is a block diagram showing a configuration of a communication terminal according to the second embodiment of the present invention.

FIG. 20 shows a configuration of the communication terminal 11 (second communication terminal). In terms of the configuration shown in FIG. 20, differences from the configuration shown in FIG. 2 will be described.

The communication terminal 11 does not include the image processing unit 101 shown in FIG. 2. For example, the controller 102 receives a processed image on which image processing has been performed from the camera 31 by using the communicator 100. The controller 102 uploads a processed image on which image processing has been performed to a page of an SNS by transmitting the processed image to the SNS server 20 and the SNS server 21 by using the communicator 100. The controller 102 receives information that is displayed with an image on a page of an SNS from the camera 31 by using the communicator 100. The controller 102 transmits information that is displayed with an image on a page of an SNS to the SNS server 20 and the SNS server 21 by using the communicator 100. The controller 102 receives various kinds of information of an SNS from the SNS server 20 and the SNS server 21 by using the communicator 100. The controller 102 transmits various kinds of information of an SNS to the camera 31 by using the communicator 100. The controller 102 receives various kinds of commands from the camera 31 by using the communicator 100.

In terms of points other than the above, the configuration shown in FIG. 20 is similar to the configuration shown in FIG. 2.

Figure 21:
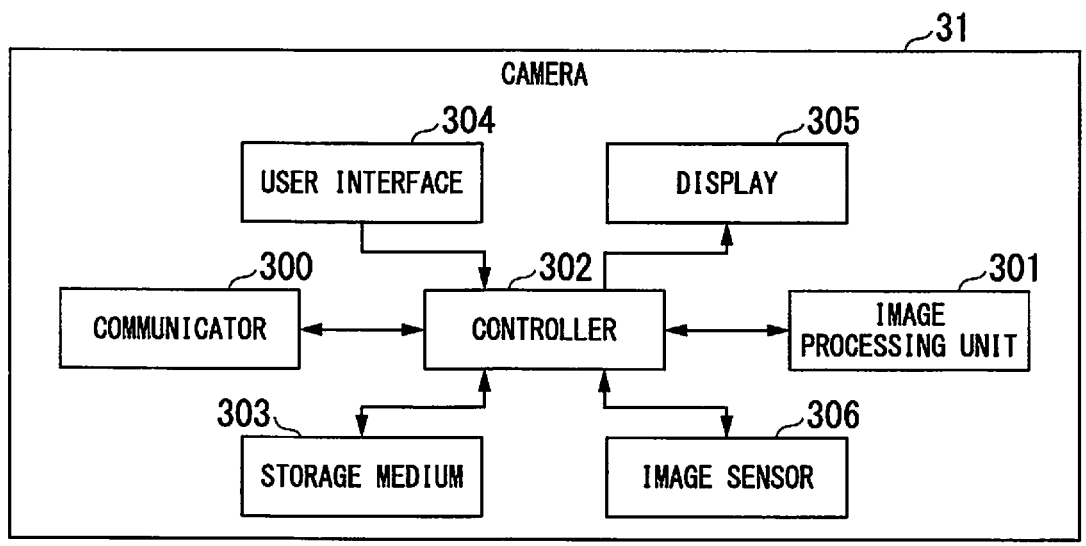
FIG. 21 is a block diagram showing a configuration of a camera according to the second embodiment of the present invention.

FIG. 21 shows a configuration of the camera 31 (first communication terminal). As shown in FIG. 21, the camera 31 includes a communicator 300 (second communicator), an image processing unit 301, a controller 302 (second controller), a storage medium 303 (first storage medium), a user interface 304, a display 305, and an image sensor 306.

The communicator 300 performs communication with the communication terminal 11. Communication performed by the communicator 300 may be wireless communication or wired communication. The communicator 300 transmits a processed image on which image processing has been performed to the communication terminal 11. The communicator 300 transmits information (a text or the like) that is displayed with an image on a page of an SNS to the communication terminal 11. The communicator 300 receives various kinds of information of an SNS from the communication terminal 11. The communicator 300 transmits various kinds of commands to the communication terminal 11.

Each of the image processing unit 301 (image processing circuit) and the controller 302 comprises at least one of a processor and a logic circuit. Each of the image processing unit 301 and the controller 302 may include one or a plurality of processors. Each of the image processing unit 301 and the controller 302 may include one or a plurality of logic circuits. The image processing unit 301 generates a processed image (second image) by performing image processing on an original image (first image). The controller 302 constitutes a control unit. The controller 302 controls the system of the camera 31.

The controller 302 may read and execute a program including commands defining the operations of the controller 302. In other words, the functions of the controller 302 can be realized as software functions. The implementation form of this program is the same as the implementation form of the program that realizes the functions of the controller 102 shown in FIG. 2.

The controller 302 transmits an image and various kinds of commands to the communication terminal 11 by using the communicator 300. More specifically, the controller 302 controls the communicator 300 such that an image and various kinds of commands are transmitted to the communication terminal 11. In other words, the controller 302 causes the communicator 300 to transmit an image and various kinds of commands for the communication terminal 11. In this way, the communicator 300 transmits an image and various kinds of commands to the communication terminal 11. The controller 302 receives information acquired from the SNS server 20 and the SNS server 21 by the communication terminal 11 from the communication terminal 11 by using the communicator 300. More specifically, the controller 302 controls the communicator 300 such that the information is received from the communication terminal 11. In other words, the controller 302 causes the communicator 300 to receive the information transmitted from the communication terminal 11. In this way, the communicator 300 receives the information from the communication terminal 11.

For example, the controller 302 transmits a processed image on which image processing has been performed to the communication terminal 11 by using the communicator 300. The controller 302 transmits information that is displayed with an image on a page of an SNS to the communication terminal 11 by using the communicator 300. The controller 302 receives various kinds of information of an SNS from the communication terminal 11 by using the communicator 300.

The storage medium 303 is a nonvolatile storage device. For example, the storage medium 303 is at least one of an EPROM, an EEPROM, a flash memory, and a hard disk drive. The storage medium 303 stores image management information in which an original image, image processing information that identifies image processing performed on the original image, and an address of a page of an SNS are associated with each other. The storage medium 303 may be an external medium of the camera 31. In other word, the storage medium 303 is not essential to the camera 31.

The user interface 304 constitutes an operation unit. The user interface 304 is at least one of a button, a switch, a key, a mouse, a joystick, a touch pad, a track ball, and a touch panel. The user interface 304 outputs an instruction to the controller 302 when a predetermined operation is performed by a user. The user interface 304 is not essential to the camera 31.

The display 305 constitutes a display unit. For example, the display 305 is at least one of a liquid crystal display and an organic EL display. The display 305 may be a touch panel display. In this case, the user interface 304 and the display 305 are integrated. The display 305 displays an image and various kinds of information. The display 305 is not essential to the camera 31.

The image sensor 306 performs imaging and generates an original image. The generated original image is recorded on the storage medium 303.

Image management information includes an original image, image processing information that identifies image processing performed on the original image, and an address of a page of an SNS. For this reason, the camera 31 can easily manage information of image processing that has been performed on each image. In addition, the camera 31 does not need to hold a processed image on which image processing has been performed. For this reason, the camera 31 can reduce the capacity of the storage medium 303 necessary for management of image processing.

Figure 22:
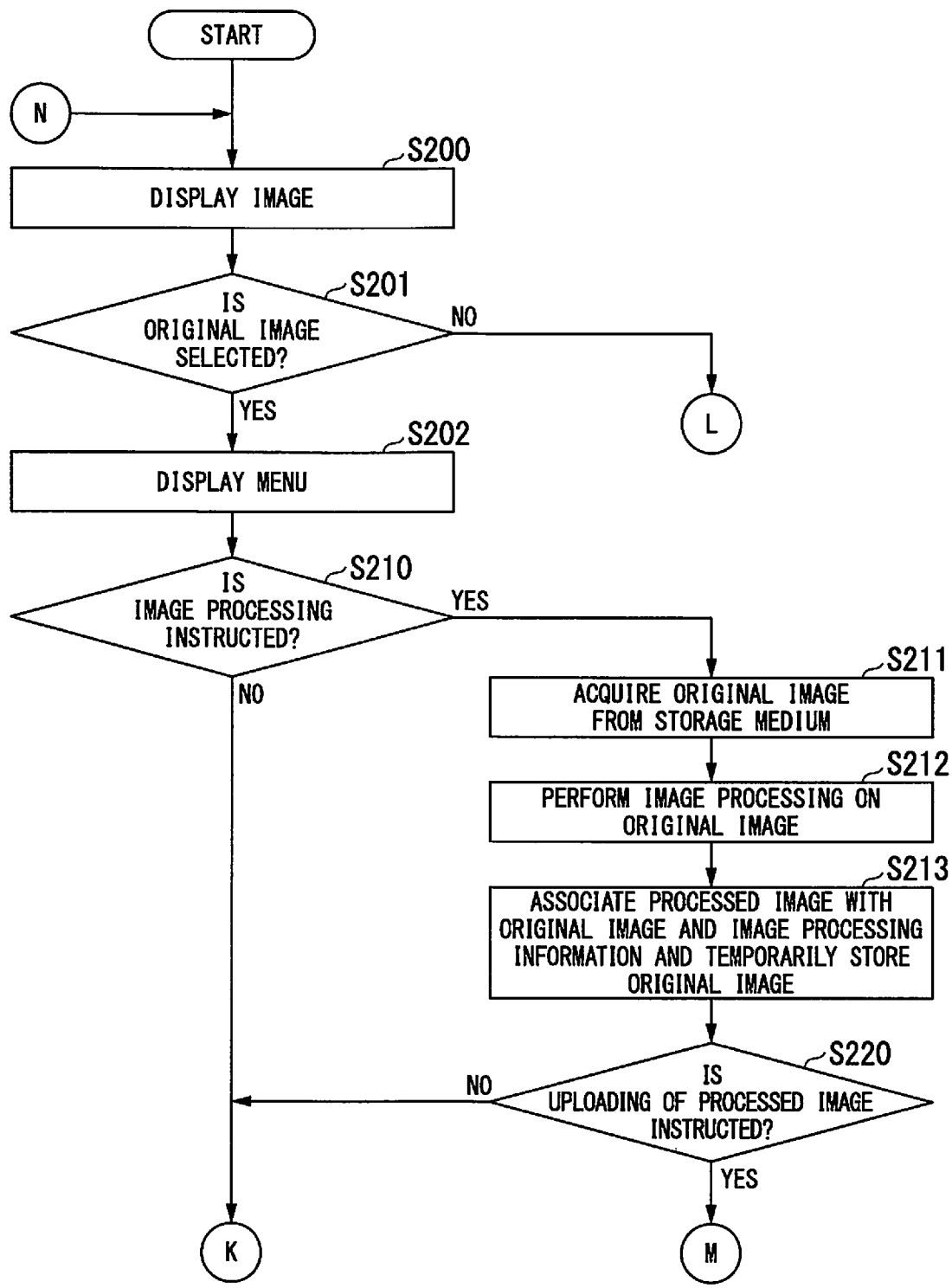
FIG. 22 is a flow chart showing a procedure of a process executed by the camera according to the second embodiment of the present invention.
Figure 23:
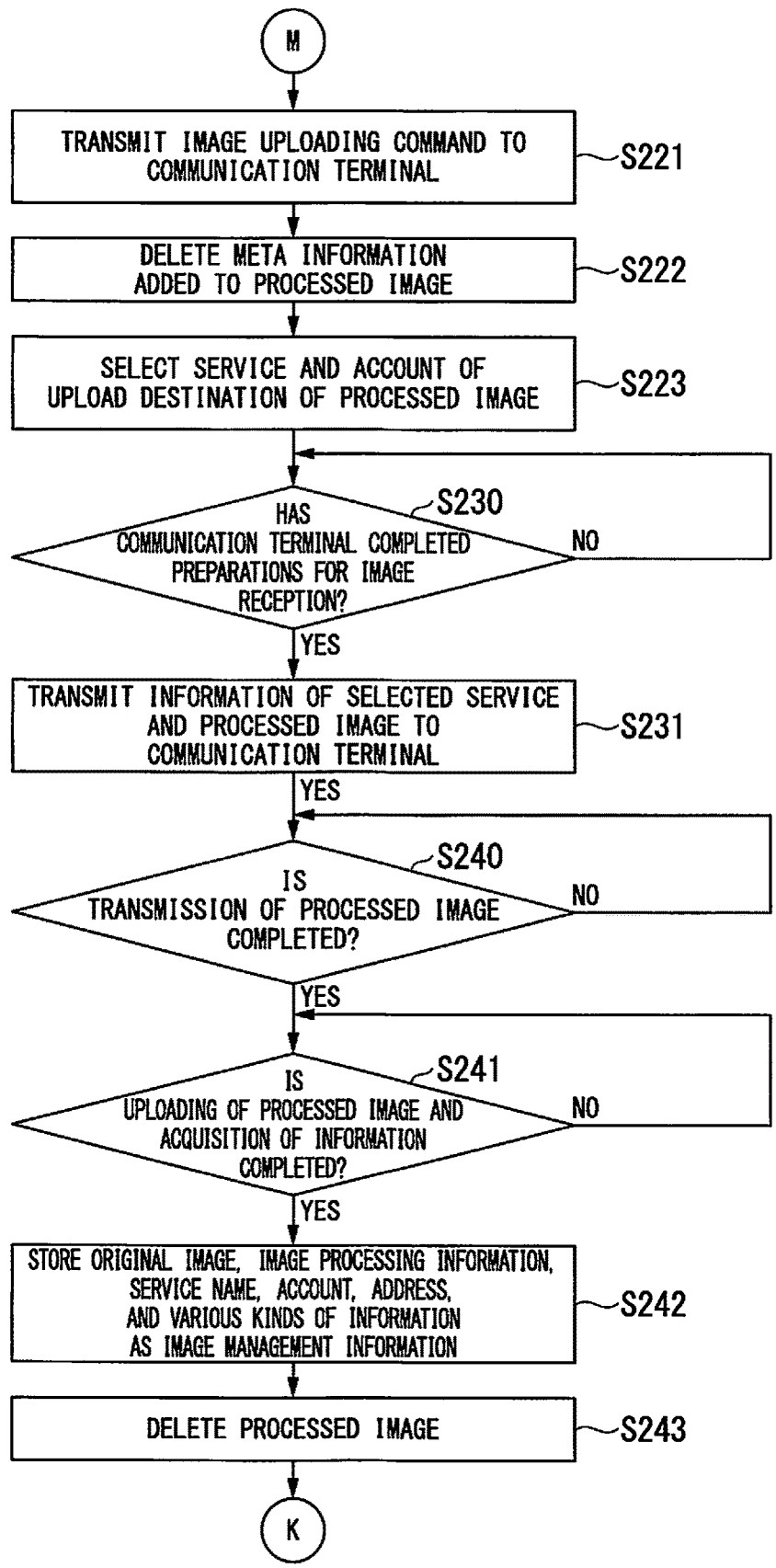
FIG. 23 is a flow chart showing a procedure of a process executed by the camera according to the second embodiment of the present invention.
Figure 24:
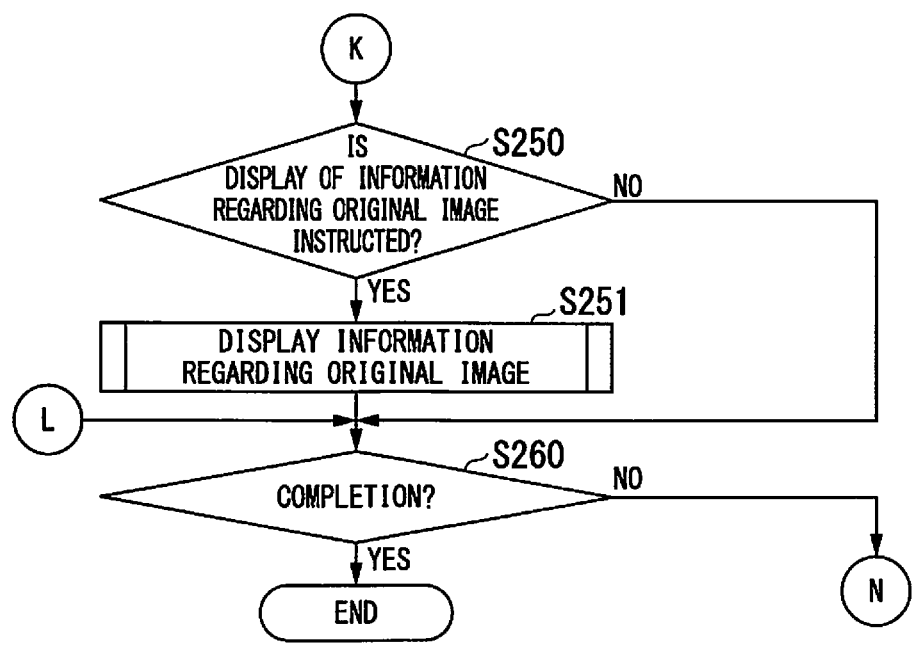
FIG. 24 is a flow chart showing a procedure of a process executed by the camera according to the second embodiment of the present invention.

FIG. 22, FIG. 23, and FIG. 24 show a procedure of a process executed by the camera 31. The operation of the camera 31 will be described with reference to FIGS. 22 to 24. For example, process shown in FIGS. 22 to 24 is executed after the image sensor 306 performs imaging. The process shown in FIGS. 22 to 24 may be executed at a timings that is not related to imaging.

(Step S200)

The controller 302 displays images on the display 305. For example, the display 305 displays a list of a plurality of thumbnails corresponding to a plurality of original images. After step S200, the process of step S201 is executed.

(Step S201)

A user selects one of the images displayed in step S200 and inputs an instruction for selecting an original image to the user interface 304. When a user inputs an instruction for selecting an original image to the user interface 304, the controller 302 accepts the instruction from the user. The controller 302 determines whether or not an instruction for selecting an original image is accepted. In step S201, when the controller 302 determines that an instruction for selecting an original image is accepted, the processing of step S202 is executed. In step S201, when the controller 302 determines that an instruction for selecting an original image is not accepted, the processing of step S260 is executed.

(Step S202)

The controller 302 displays a menu on the display 305. For example, the menu includes graphics for accepting instructions from a user regarding image processing, uploading of an image, display of information, and completion. After step S202, the process of step S210 is executed.

(Step S210)

When a user inputs an instruction for image processing to the user interface 304, the controller 302 accepts the instruction from the user. The controller 302 determines whether or not an instruction for image processing is accepted. In step S210, when the controller 302 determines that an instruction for image processing is accepted, the processing of step S211 is executed. In step S210, when the controller 302 determines that an instruction for image processing is not accepted, the processing of step S250 is executed.

(Step S211)

The controller 302 reads the original image selected by a user in step S201 from the storage medium 303. In this way, the controller 302 acquires the original image from the storage medium 303. After step S211, the process of step S212 is executed.

(Step S212)

The controller 302 outputs the original image acquired from the storage medium 303 to the image processing unit 301 and requests image processing for the original image to the image processing unit 301. The image processing unit 301 generates a processed image by performing image processing on the original image. The image processing unit 301 outputs the generated processed image and image processing information corresponding to the image processing performed on the original image to the controller 302. The image processing unit 301 may generate a thumbnail of a processed image in addition to the processed image. After step S212, the process of step S213 is executed.

For example, image processing performed by the image processing unit 301 is at least one of trimming, exposure correction, white balance correction, picturesque filtering, and resolution conversion (resizing). The image processing unit 301 may perform image processing other than the above-described image processing. In a case where an original image is a RAW image, the image processing unit 301 performs development and the above-described image processing. In a case where an original image is a JPEG image, the image processing unit 301 performs the above-described image processing.

(Step S213)

The controller 302 associates a processed image with an original image and image processing information. The controller 302 temporarily records the processed image, the original image, and the image processing information on the storage medium 303. Image processing information identifies the image processing performed on the original image in step S212. After step S213, the process of step S220 is executed.

(Step S220)

When a user inputs an instruction for uploading a processed image to the user interface 304, the controller 302 accepts the instruction from the user. The controller 302 determines whether or not an instruction for uploading a processed image is accepted. In step S220, when the controller 302 determines that an instruction for uploading a processed image is accepted, the processing of step S221 is executed. In step S220, when the controller 302 determines that an instruction for uploading a processed image is not accepted, the processing of step S250 is executed.

(Step S221)

The controller 302 transmits an image uploading command to the communication terminal 11 by using the communicator 300. After step S221, the process of step S222 is executed.

(Step S222)

Meta information has been added to an original image and a processed image. The controller 302 deletes meta information added to a processed image. After step S222, the process of step S223 is executed.

(Step S223)

For example, a user inputs an instruction for designating a service and an account of an upload destination of a processed image to the user interface 304. The controller 302 accepts the instruction from the user. The controller 302 selects a service and an account of an upload destination of a processed image on the basis of the instruction. After step S223, the process of step S230 is executed.

(Step S230)

When the communication terminal 11 has completed preparations for image reception, a notification that represents completion of preparations for image reception is transmitted from the communication terminal 11. When the notification is transmitted from the communication terminal 11, the controller 302 receives the notification from the communication terminal 11 by using the communicator 300. The controller 302 monitors the communicator 300 and determines whether or not the notification is received. In this way, the controller 302 determines whether or not the communication terminal 11 has completed preparations for image reception. In step S230, when the controller 302 determines that the communication terminal 11 has completed preparations for image reception, the process of step S231 is executed. In step S230, when the controller 302 determines that the communication terminal 11 has not completed preparations for image reception, the determination of step S230 is repeated.

(Step S231)

The controller 302 transmits information of the service selected in step S223 and a processed image to the communication terminal 11 by using the communicator 300. Information of a service includes a service name and an account. When there is information that is displayed with an image on a page of an SNS, the controller 302 transmits the information to the communication terminal 11 by using the communicator 300 in addition to information of a service and a processed image. After step S231, the process of step S240 is executed.

A plurality of processed images may be uploaded. For example, the image processing unit 301 may generate a plurality of processed images by performing image processing on a plurality of original images. The image processing unit 301 may generate a plurality of processed images by repetitively performing image processing on the same original image. The controller 302 may transmit a plurality of processed images to the communication terminal 11 by using the communicator 300. An original image may be uploaded in addition to a processed image. In other words, the controller 302 may transmit a processed image and an original image to the communication terminal 11 by using the communicator 300.

A user may input a text to the user interface 304. The user interface 304 may accept a text from the user. When a text is accepted by the user interface 304, the controller 302 may transmit the text to the communication terminal 11 in addition to a processed image.

(Step S240)

The controller 302 monitors the communicator 300 and determines whether or not transmission of a processed image is completed. In step S240, when the controller 302 determines that transmission of a processed image is completed, the process of step S241 is executed. In step S240, when the controller 302 determines that transmission of a processed image is not completed, the determination of step S240 is repeated.

(Step S241)

When uploading of a processed image and acquisition of various kinds of information from the SNS server 20 are completed in the communication terminal 11, an address of a page of an SNS to which the processed image has been uploaded and various kinds of information are transmitted from the communication terminal 11. When an address and various kinds of information are transmitted from the communication terminal 11, the controller 302 receives the address and the various kinds of information from the communication terminal 11 by using the communicator 300. The controller 302 monitors the communicator 300 and determines whether or not an address and various kinds of information are received. In this way, the controller 302 determines whether or not uploading of a processed image and acquisition of information are completed. In step S241, when the controller 302 determines that uploading of a processed image and acquisition of information are completed, the process of step S242 is executed. In step S241, when the controller 302 determines that uploading of a processed image and acquisition of information are not completed, the determination of step S241 is repeated.

The controller 302 may designate an address of a page to which a processed image is uploaded. In this case, the controller 302 transmits information of a service, a processed image, and an address to the communication terminal 11 by using the communicator 300 in step S231.

(Step S242)

The controller 302 records image management information in which an original image, image processing information, a service name, an account, an address, and various kinds of information are associated with each other onto the storage medium 303. In image management information, a service name, an account, and various kinds of information are not essential. Therefore, the controller 302 records image management information in which at least an original image, image processing information, and an address are associated with each other onto the storage medium 303 in step S242. After step S242, the process of step S243 is executed.

In step S222, meta information is deleted. For this reason, the controller 302 transmits a processed image from which meta information has been deleted to the communication terminal 11 by using the communicator 300 in step S231. Various kinds of information recorded as image management information in step S242 include information (first information) that represents that meta information has been deleted. Therefore, the controller 302 records image management information in which an original image, image processing information, an address, and information that represents that meta information has been deleted are associated with each other onto the storage medium 303 in step S242.

(Step S243)

The controller 302 deletes a processed image temporarily stored on the storage medium 303. After step S243, the process of step S250 is executed.

(Step S250)

When a user inputs an instruction for displaying information regarding an original image to the user interface 304, the controller 302 accepts the instruction from the user. The controller 302 determines whether or not an instruction for displaying information regarding an original image is accepted. In step S250, when the controller 302 determines that an instruction for displaying information regarding an original image is accepted, the process of step S251 is executed. In step S250, when the controller 302 determines that an instruction for displaying information regarding an original image is not accepted, the process of step S260 is executed.

(Step S251)

The controller 302 executes a process for displaying information regarding an original image. Details of the process executed in step S251 will be described below. After step S251, the process of step S260 is executed.

(Step S260)

When a user inputs an instruction for completion to the user interface 304, the controller 302 accepts the instruction from the user. The controller 302 determines whether or not an instruction for completion is accepted. In step S260, when the controller 302 determines that an instruction for completion is accepted, the process shown in FIGS. 22 to 24 is completed. In step S260, when the controller 302 determines that an instruction for completion is not accepted, the process of step S200 is executed.

The SNS server 20 may delete meta information added to a processed image. In the SNS server 20, the controller 202 deletes meta information added to a processed image received from the communication terminal 11. The controller 202 associates a processed image from which meta information has been deleted with an account, and records the processed image on the storage medium 203. The controller 202 transmits information (first information) that represents that meta information has been deleted to the communication terminal 11 by using the communicator 200. In the communication terminal 11, the controller 102 receives the information from the SNS server 20 by using the communicator 100 and transmits the information to the camera 31 by using the communicator 100.

When the SNS server 20 deletes meta information added to a processed image (second image) and the communication terminal 11 transmits information that represents that meta information has been deleted, the controller 302 receives the information from the communication terminal 11 by using the communicator 300 in step S241. The controller 302 records image management information in which an original image, image processing information, an address, and information that represents that meta information has been deleted onto the storage medium 303 in step S242.

The process of steps S200 to S202 is not essential. The process of steps S200 to S202 may be executed or may not be executed regardless of whether or not any other process is executed. The process of steps S222 is not essential. The process of step S222 may be executed or may not be executed regardless of whether or not any other process is executed. Reception of various kinds of information in step S241 is not essential. Reception of various kinds of information in step S241 may be executed or may not be executed regardless of whether or not any other process is executed. The process executed after the process of step S242 is executed is not essential. The process executed after the process of step S242 is executed may be executed or may not be executed regardless of whether or not any other process is executed.

Figure 25:
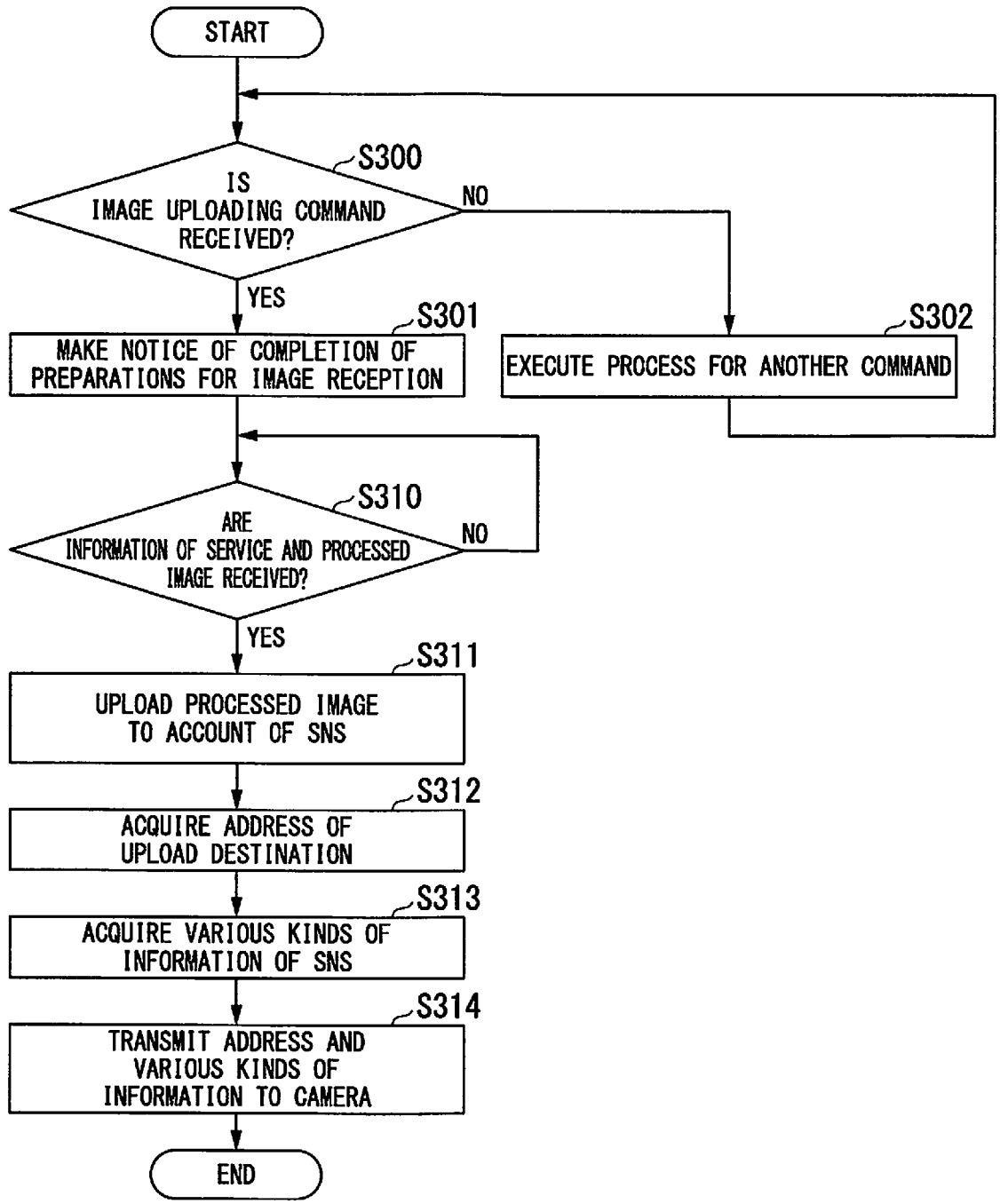
FIG. 25 is a flow chart showing a procedure of a process executed by the communication terminal according to the second embodiment of the present invention.

FIG. 25 shows a procedure of a process executed by the communication terminal 11. The operation of the communication terminal 11 will be described with reference to FIG. 25.

(Step S300)

When an image uploading command is transmitted from the camera 31, the controller 102 receives the image uploading command from the camera 31 by using the communicator 100. The controller 102 monitors the communicator 100 and determines whether or not an image uploading command is received. In step S300, when the controller 102 determines that an image uploading command is received, the process of step S301 is executed. In step S300, when the controller 102 determines that an image uploading command is not received, the process of step S302 is executed.

(Step S301)

The controller 102 makes preparations for receiving an image. When the preparations are completed, the controller 102 transmits a notification that represents completion of preparations for image reception to the camera 31 by using the communicator 100. After step S301, the process of step S310 is executed.

(Step S302)

The controller 102 executes a process for a command other than the image uploading command. After step S302, the process of step S300 is executed.

(Step S310)

When information of a service and a processed image are transmitted from the camera 31, the controller 102 receives the information of the service and the processed image from the camera 31 by using the communicator 100. Information of a service includes a service name and an account. The controller 102 monitors the communicator 100 and determines whether or not information of a service and a processed image are received. In step S310, when the controller 102 determines that information of a service and a processed image are received, the process of step S311 is executed. In step S310, when the controller 102 determines that information of a service and a processed image are not received, the determination of step S310 is repeated. When information that is displayed with an image on a page of an SNS is transmitted from the camera 31, the controller 102 receives the information from the camera 31 by using the communicator 100 in addition to information of a service and a processed image.

(Step S311)

The controller 102 transmits a processed image and information of an account to the SNS server 20 corresponding to the service represented by the information received from the camera 31 by using the communicator 100. In this way, the controller 102 uploads a processed image to a page of an SNS. When information that is displayed with an image on a page of an SNS is received, the controller 102 transmits the information to the SNS server 20 by using the communicator 100 in addition to a processed image and information of an account. When an address is received, the controller 102 transmits the address to the SNS server 20 by using the communicator 100 in addition to a processed image and information of an account. After step S311, the process of step S312 is executed.

In the SNS server 20, the controller 202 receives a processed image and information of an account from the communication terminal 11 by using the communicator 200. The controller 202 associates a processed image with an account and records the processed image on the storage medium 203. At this time, the controller 202 records a processed image on a location represented by a predetermined address in the storage medium 203. When information that is displayed with an image on a page of an SNS is transmitted from the communication terminal 11, the controller 202 receives the information from the communication terminal 11 by using the communicator 200. The controller 202 associates the information with an account and records the information on the storage medium 203.

A user may input a text to the user interface 104. The user interface 104 may accept a text from the user. When a text is accepted by the user interface 104, the controller 102 may transmit the text to the SNS server 20 in addition to a processed image.

(Step S312)

The controller 102 acquires an address of a page to which a processed image has been uploaded. The process of step S312 is similar to the process of step S124. After step S312, the process of step S313 is executed.

(Step S313)

The controller 102 acquires various kinds of information of an SNS. The process of step S313 is similar to the process of step S125. After step S313, the process of step S314 is executed.

(Step S314)

The controller 102 transmits the address acquired in step S312 and the various kinds of information acquired in step S313 to the camera 31 by using the communicator 100. When the process of step S314 is executed, the process shown in FIG. 25 is completed.

The controller 102 may monitor the state of the camera 31 by using the polling. When uploading of an image is requested from the camera 31, the process of step S301 may be executed.

In a case where the communicator 100 cannot simultaneously perform communication with the camera 31 and the SNS server 20, the communicator 100 disconnects the communication with the camera 31 and performs communication with the SNS server 20 in step S311. After various kinds of information are acquired in step S313, the communicator 100 disconnects the communication with the SNS server 20 and performs communication with the camera 31 in step S314.

The process of step S301 and step S302 is not essential. The process of step S301 and step S302 may be executed or may not be executed regardless of whether or not any other process is executed. The process of step S313 and transmission of various kinds of information in step S314 are not essential. The process of step S313 and transmission of various kinds of information in step S314 may be executed or may not be executed regardless of whether or not any other process is executed.

Figure 26:
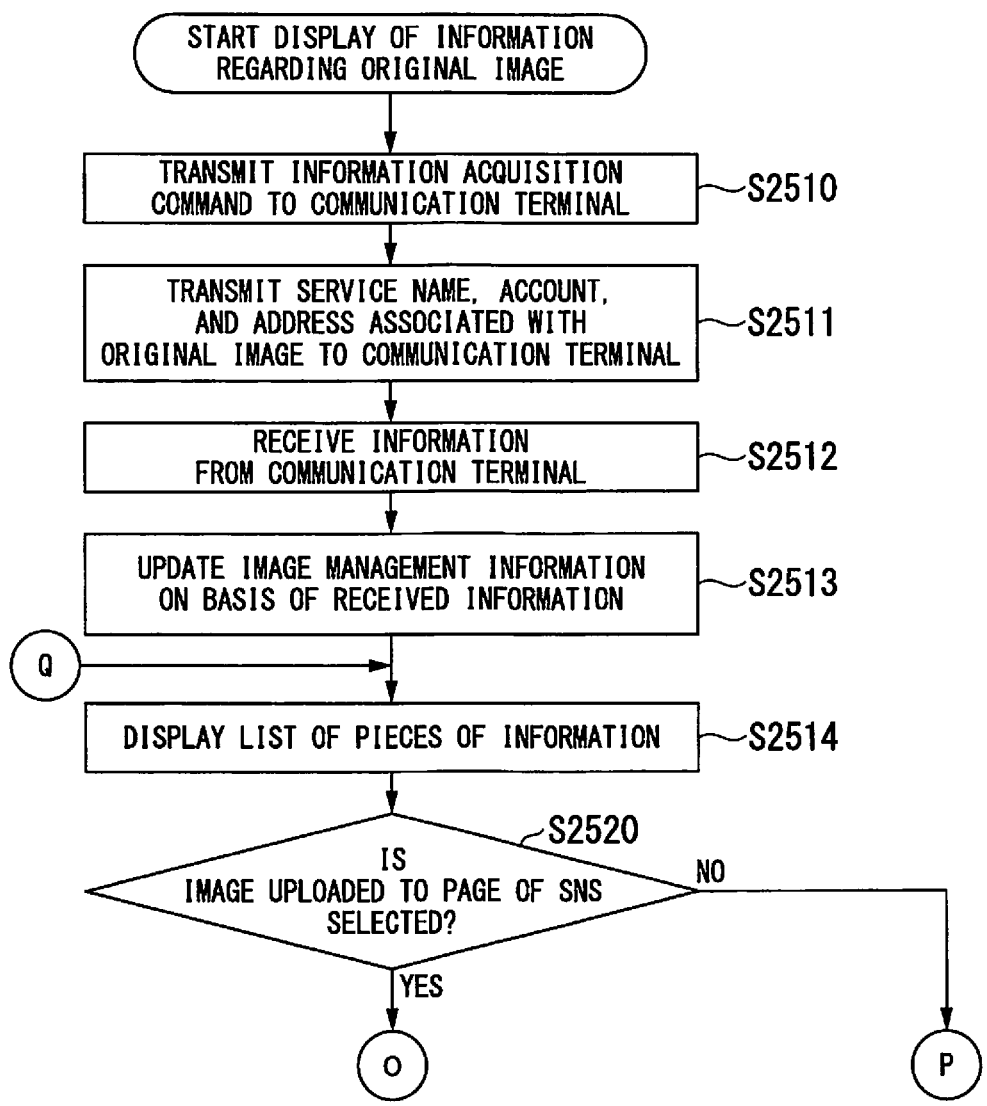
FIG. 26 is a flow chart showing a procedure of a process executed by the camera according to the second embodiment of the present invention.
Figure 27:
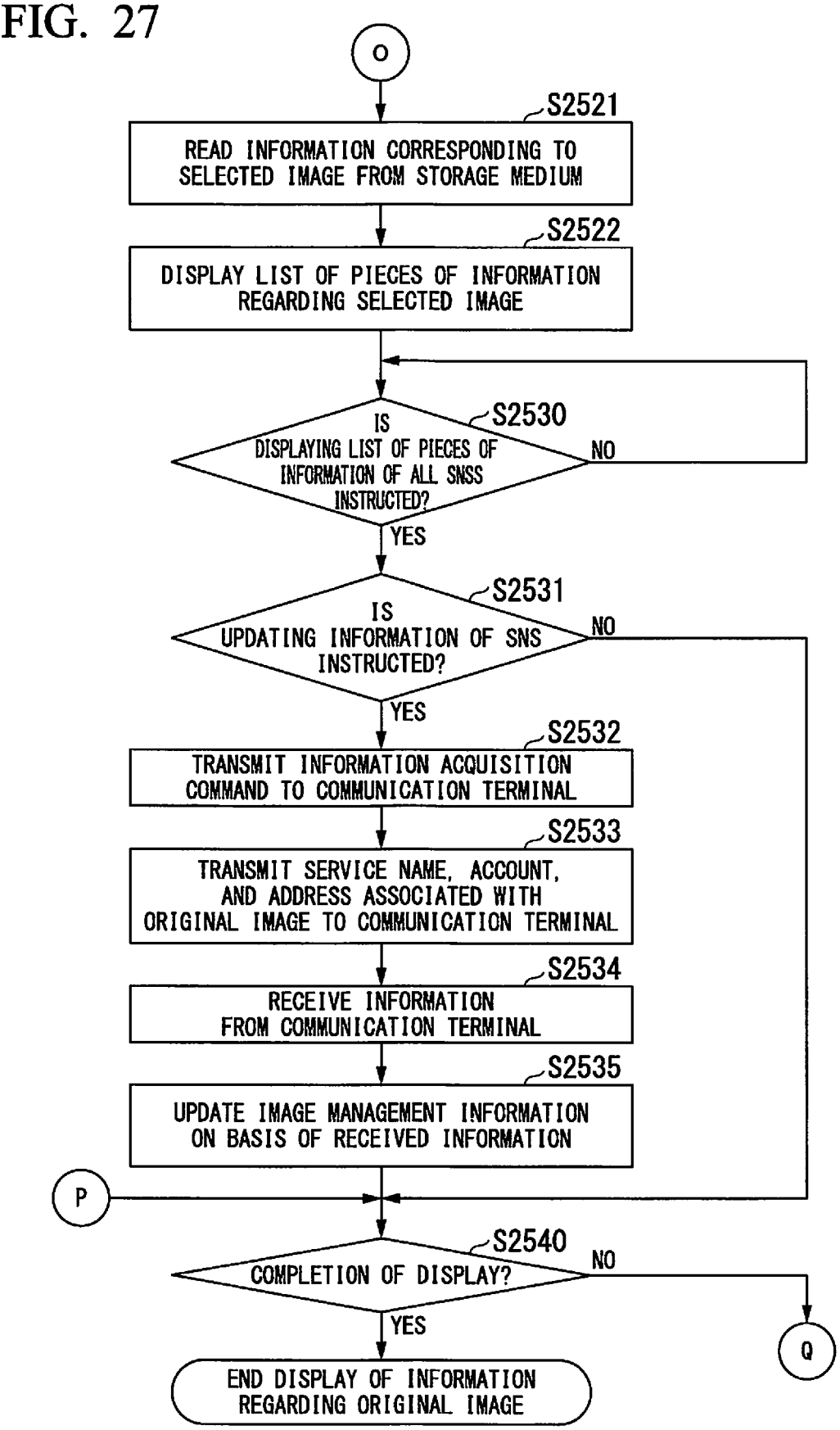
FIG. 27 is a flow chart showing a procedure of a process executed by the camera according to the second embodiment of the present invention.

FIG. 26 and FIG. 27 show details of a process of step S251. The operation of the camera 31 will be described with reference to FIG. 26 and FIG. 27.

(Step S2510)

The controller 302 transmits an information acquisition command to the communication terminal 11 by using the communicator 300. After step S2510, the process of step S2511 is executed.

(Step S2511)

The controller 302 acquires a service name, an account, and an address associated with the original image selected in step S201 in image management information. The controller 302 transmits the service name, the account, and the address that have been acquired to the communication terminal 11 by using the communicator 300. After step S2511, the process of step S2512 is executed.

(Step S2512)

The controller 302 receives information from the communication terminal 11. The information received in step S2512 is similar to the information received in step S1310. After step S2512, the process of step S2513 is executed.

(Step S2513)

The controller 302 updates image management information on the basis of the information received in step S2512. After step S2513, the process of step S2514 is executed.

(Step S2514)

The controller 302 displays a list of pieces of information constituting image management information on the display 305. The information displayed in step S2514 is similar to the information displayed in step S1313. After step S2514, the process of step S2520 is executed.

(Step S2520)

In step S2512, information of an uploaded processed image is received. For example, a thumbnail of a processed image is received. In step S2520, a list of pieces of information of a processed image is displayed. A user inputs an instruction for selecting an image uploaded to an SNS to the user interface 304 by selecting one of the pieces of information of a processed image displayed in step S2520. When a user inputs an instruction for selecting an image uploaded to an SNS to the user interface 304, the controller 302 accepts the instruction from the user. The controller 302 determines whether or not an instruction for selecting an image uploaded to an SNS is accepted. In step S2520, when the controller 302 determines that an instruction for selecting an image uploaded to an SNS is accepted, the process of step S2521 is executed. In step S2520, when the controller 302 determines that an instruction for selecting an image uploaded to an SNS is not accepted, the process of step S2540 is executed.

(Step S2521)

In step S2520, an instruction for selecting an image uploaded to an SNS is accepted. The controller 302 acquires information associated with information of a processed image corresponding to the instruction in image management information. In other words, the controller 302 reads information corresponding to the image selected in step S2520 from the storage medium 303. After step S2521, the process of step S2522 is executed.

(Step S2522)

The controller 302 displays the information read in step S2521 on the display 305. In other words, the controller 302 displays a list of pieces of information corresponding to the image selected in step S2520 on the display 305. After step S2522, the process of step S2530 is executed.

(Step S2530)

When a user inputs an instruction for displaying a list of pieces of information of all the SNSs to the user interface 304, the controller 302 accepts the instruction from the user. The controller 302 determines whether or not an instruction for displaying a list of pieces of information of all the SNSs is accepted. In other words, the controller 302 determines whether or not the state of the display 305 is returned to the state in step S2514. In step S2530, when the controller 302 determines that an instruction for displaying a list of pieces of information of all the SNSs is accepted, the process of step S2531 is executed. In step S2530, when the controller 302 determines that an instruction for displaying a list of pieces of information of all the SNSs is not accepted, the determination of step S2530 is repeated.

(Step S2531)

When a user inputs an instruction for updating information of an SNS to the user interface 304, the controller 302 accepts the instruction from the user. The controller 302 determines whether or not an instruction for updating information of an SNS is accepted. In step S2531, when the controller 302 determines that an instruction for updating information of an SNS is accepted, the process of step S2532 is executed. In step S2531, when the controller 302 determines that an instruction for updating information of an SNS is not accepted, the process of step S2540 is executed.

(Step S2532)

The process similar to the process of step S2510 is executed in step S2532. After step S2532, the process of step S2533 is executed.

(Step S2533)

The process similar to the process of step S2511 is executed in step S2533. After step S2533, the process of step S2534 is executed.

(Step S2534)

The process similar to the process of step S2512 is executed in step S2534. After step S2534, the process of step S2535 is executed.

(Step S2535)

The process similar to the process of step S2513 is executed in step S2535. After step S2535, the process of step S2540 is executed.

(Step S2540)

When a user inputs an instruction for completing display to the user interface 304, the controller 302 accepts the instruction from the user. The controller 302 determines whether or not an instruction for completing display is accepted. In step S2540, when the controller 302 determines that an instruction for completing display is accepted, the process shown in FIG. 26 and FIG. 27 is completed. In step S2540, when the controller 302 determines that an instruction for completing display is not accepted, the process of step S2514 is executed.

The controller 302 records image management information in which an original image (first image), image processing information, an address, and a thumbnail (fourth information) regarding a processed image (second image) are associated with each other onto the storage medium 303 in step S242. The controller 302 displays one or more thumbnails on the display 305 in step S2522. The controller 302 may accept designation of any one of the thumbnails displayed on the display 305. The image processing unit 301 may perform image processing on an original image associated with the designated thumbnail on the basis of image processing information associated with the designated thumbnail.

The controller 302 may accept designation of an address. Designation of a page of an SNS may be accepted, and thus designation of an address may be accepted. In this case, the controller 302 reads image processing information associated with the designated processed image from the storage medium 303. The image processing unit 301 performs image processing on an original image (first image) associated with the address accepted by the controller 302 on the basis of image processing information associated with the address accepted by the controller 302.

The process of steps S2510 to S2513 is not essential. The process of steps S2510 to S2513 may be executed or may not be executed regardless of whether or not any other process is executed. The process of steps S2510 to S2513 may not be executed and a list of pieces of information included in image management information recorded on the storage medium 303 may be displayed in step S2514. The process of steps S2531 to S2535 is not essential. The process of steps S2531 to S2535 may be executed or may not be executed regardless of whether or not any other process is executed.

Figure 28:
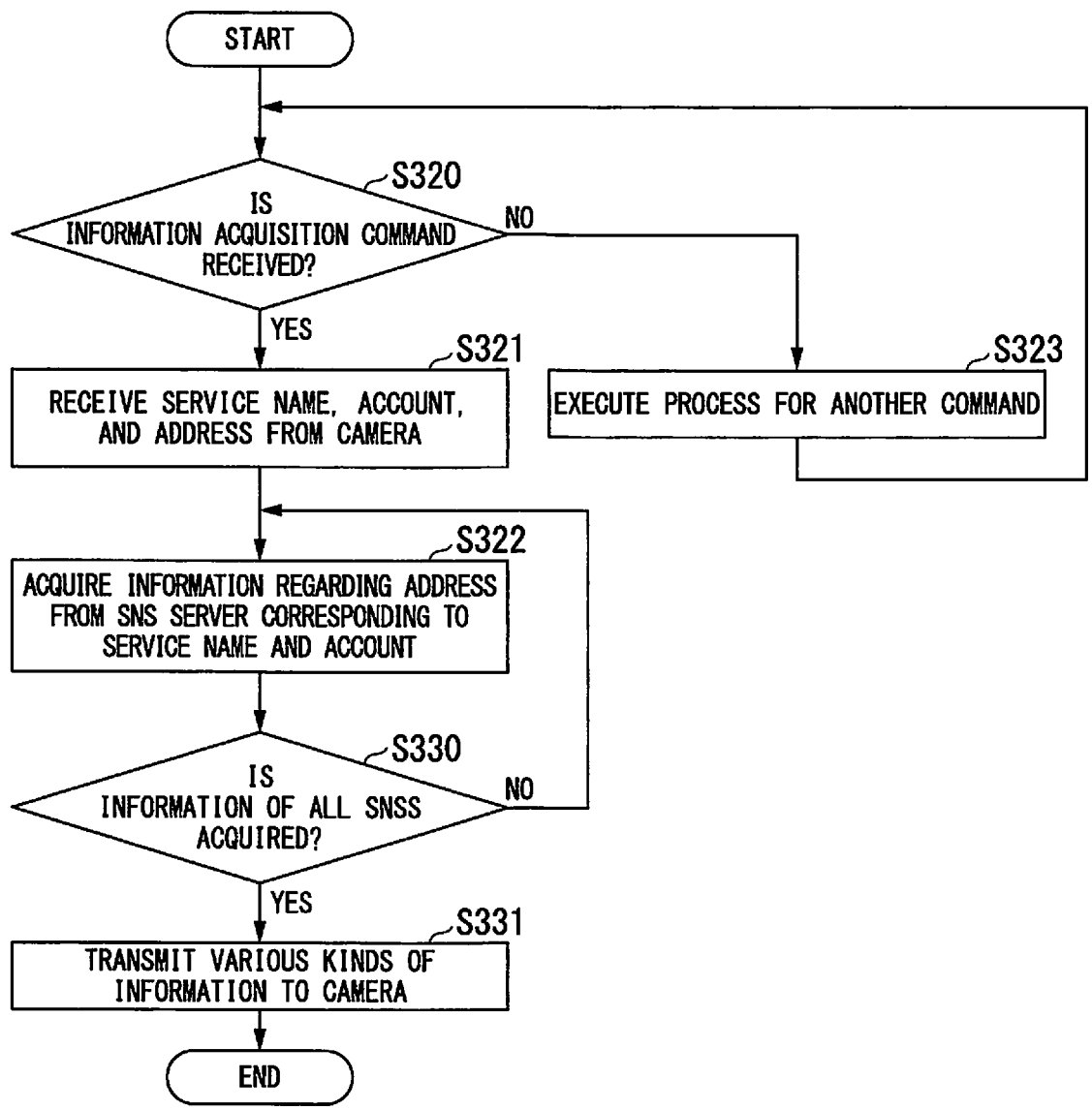
FIG. 28 is a flow chart showing a procedure of a process executed by the communication terminal according to the second embodiment of the present invention.

FIG. 28 shows a procedure of a process executed by the communication terminal 11 when the process shown in FIG. 26 and FIG. 27 is executed.

(Step S320)

When an information acquisition command is transmitted from the camera 31, the controller 102 receives the information acquisition command from the camera 31 by using the communicator 100. The controller 102 monitors the communicator 100 and determines whether or not an information acquisition command is received. In step S320, when the controller 102 determines that an information acquisition command is received, the process of step S321 is executed. In step S320, when the controller 102 determines that an information acquisition command is not received, the process of step S323 is executed.

(Step S321)

The controller 102 receives a service name, an account, and an address from the camera 31 by using the communicator 100. After step S321, the process of step S322 is executed.

(Step S322)

The controller 102 transmits an information acquisition request to the SNS server 20 corresponding to the service name and the account that have been received in step S321 by using the communicator 100. An information acquisition request includes the address. The controller 102 acquires information by receiving the information from the SNS server 20. The information received in step S322 is similar to the information acquired in step S1310. After step S322, the process of step S330 is executed.

In the SNS server 20, the controller 202 receives an information acquisition request from the communication terminal 11 by using the communicator 200. The controller 202 transmits information corresponding to the account and the address included in the information acquisition request to the communication terminal 11 by using the communicator 200.

(Step S323)

The controller 102 executes a process for a command other than the information acquisition command. After step S323, the process of step S320 is executed.

(Step S330)

The controller 102 determines whether or not information of all the SNSs is acquired. When information corresponding to all of the combinations of the service name, the account, and the address that are received in step S321 is received, the controller 102 determines that information of all the SNSs is acquired. In other cases, the controller 102 determines that information of some of the SNSs is not acquired. In step S330, when the controller 102 determines that information of all the SNSs is acquired, the process of step S331 is executed. In step S330, when the controller 102 determines that information of some of the SNSs is not acquired, the process of step S332 is executed.

(Step S331)

The controller 102 transmits the various kinds of information acquired in step S322 to the camera 31 by using the communicator 100. When the process of step S331 is executed, the process shown in FIG. 28 is completed.

The controller 102 may monitor the state of the camera 31 by using the polling. When acquisition of information is requested from the camera 31, the process of step S321 may be executed.

An image management method according to a second aspect of the present invention is based on the operation shown in FIG. 22 and FIG. 23. The image management method according to the second aspect includes an image acquisition step, an image generation step, an uploading step, and a recording step. In the image acquisition step (step S211), a first image (original image) is acquired. In the image generation step (step S212), a second image (processed image) is generated by performing image processing on the first image. In the uploading step (step S311), the second image is uploaded to a page of an SNS by transmitting the second image to the SNS server 20. In the recording step (step S242), image management information in which the first image, image processing information that identifies the image processing, and an address of the page of the SNS are associated with each other is recorded onto the storage medium 303.

An image management method according to the second aspect of the present invention may not include a process other than the process corresponding to the above-described steps.

In the second embodiment, image management information in which an original image, image processing information that identifies image processing performed on the original image, and an address of a page of an SNS are associated with each other is recorded onto the storage medium 303. For this reason, the camera 31 can easily manage information of image processing that has been performed on each image and reduce the capacity of the storage medium 303 necessary for management of image processing. In addition, the camera 31 can generate a high-resolution image again by performing image processing almost similar to that which is performed on a processed image uploaded to a page of an SNS on an original image.

While preferred embodiments of the invention have been described and shown above, it should be understood that these are examples of the invention and are not to be considered as limiting. Additions, omissions, substitutions, and other modifications can be made without departing from the spirit or scope of the present invention. Accordingly, the invention is not to be considered as being limited by the foregoing description, and is only limited by the scope of the appended claims.

What is claimed is:

1. A communication terminal comprising:
a communicator;
an image processing circuit; and
a controller,
wherein the controller is configured to acquire a first image,
the image processing circuit is configured to generate a second image by performing image processing on the first image, the controller is configured to upload the second image to a page of a social networking service (SNS) by transmitting the second image to an SNS server by using the communicator, and the controller is configured to record image management information in which the first image, image processing information that identifies the image processing, and an address of the page are associated with each other onto a storage medium, wherein the controller is configured to receive second information that represents at least one of TAG information and a personal recognition result associated with the second image by the SNS server from the SNS server by using the communicator, and the controller is configured to record the image management information in which the first image, the image processing information, the address, and the second information are associated with each other onto the storage medium.

2. A communication terminal comprising:
a communicator;
an image processing circuit; and
a controller,
wherein the controller is configured to acquire a first image, the image processing circuit is configured to generate a second image by performing image processing on the first image, the controller is configured to upload the second image to a page of a social networking service (SNS) by transmitting the second image to an SNS server by using the communicator, and the controller is configured to record image management information in which the first image, image processing information that identifies the image processing, and an address of the page are associated with each other onto a storage medium, wherein the controller is configured to generate second information that represents at least one of TAG information and a personal recognition result associated with the second image and transmit the second information to the SNS server by using the communicator, and the controller is configured to record the image management information in which the first image, the image processing information, the address, and the second information are associated with each other onto the storage medium.

3. An image management system comprising:
an image uploading system; and
a social networking service (SNS) server,
wherein the image uploading system is configured to acquire a first image, the image uploading system is configured to generate a second image by performing image processing on the first image, the image uploading system is configured to upload the second image to a page of an SNS by transmitting the second image to the SNS server, the image uploading system is configured to record image management information in which the first image, image processing information that identifies the image processing, and an address of the page are associated with each other onto a first storage medium, the SNS server includes
a first communicator, and
a first controller,
the first controller is configured to receive the second image from the image uploading system by using the first communicator, and the first controller is configured to record the second image on a location represented by the address in a second storage medium that stores information of the page of the SNS, wherein the image uploading system includes
a first communication terminal, and
a second communication terminal,
the first communication terminal includes
a second communicator,
an image processing circuit, and
a second controller,
the second controller is configured to acquire the first image, the image processing circuit is configured to generate the second image by performing the image processing on the first image, the second controller is configured to transmit the second image to the second communication terminal by using the second communicator, the second communication terminal includes
a third communicator, and
a third controller,
the third controller is configured to receive the second image from the first communication terminal by using the third communicator, the third controller is configured to upload the second image to the page of the SNS by transmitting the second image to the SNS server by using the third communicator, the third controller is configured to transmit the address of the page to the first communication terminal by using the third communicator, the second controller is configured to receive the address of the page from the second communication terminal by using the second communicator, and the second controller is configured to record the image management information in which the first image, the image processing information, and the address of the page are associated with each other onto the first storage medium.

* * * * *